US010853855B2

(12) United States Patent
John

(10) Patent No.: US 10,853,855 B2
(45) Date of Patent: Dec. 1, 2020

(54) SYSTEMS AND METHODS FOR AUTOMATIC AND TRANSPARENT CLIENT AUTHENTICATION AND ONLINE TRANSACTION VERIFICATION

(76) Inventor: Michael Sasha John, Larchmont, NY (US)

( * ) Notice: Subject to any disclaimer, the term of this patent is extended or adjusted under 35 U.S.C. 154(b) by 1130 days.

(21) Appl. No.: 12/124,144

(22) Filed: May 20, 2008

(65) Prior Publication Data

US 2008/0288405 A1     Nov. 20, 2008

Related U.S. Application Data

(60) Provisional application No. 60/939,066, filed on May 20, 2007, provisional application No. 60/977,375, (Continued)

(51) Int. Cl.
*G06Q 30/06* (2012.01)
*G06Q 20/40* (2012.01)

(52) U.S. Cl.
CPC ............ *G06Q 30/06* (2013.01); *G06Q 20/40* (2013.01)

(58) Field of Classification Search
CPC .... G06Q 20/4016; G06Q 40/00; G06Q 20/20; G06Q 30/00; G06Q 20/0655; G06Q 20/22; G06Q 20/367; G06Q 20/3674; G06Q 20/401; G06Q 30/0225; G06Q 30/06; G06Q 30/0601; G06Q 30/0609; G06Q 30/0641; G06Q 20/00; G06Q 20/03; G06Q 30/0248;
(Continued)

(56) References Cited

U.S. PATENT DOCUMENTS 5,999,596 A * 12/1999 Walker et al. ............. 379/91.01
7,096,192 B1 * 8/2006 Pettitt .................... G06Q 20/10
  701/1
(Continued)

OTHER PUBLICATIONS

"Server." Microsoft Computer Dictionary. 5th ed. Redmond: Microsoft, 2002. 474. (3 pages).*
(Continued)

*Primary Examiner* — Elda G Milef
(74) *Attorney, Agent, or Firm* — Rosenberg, Klein & Lee

(57) ABSTRACT

Systems and methods are described for providing fraud deterrents, detection and prevention during e-commerce, e-transactions, digital rights management and access control. Fraud deterrent levels may be automatically selected by a requesting transaction approval entity server (and can be related to level of risk, or security, related to fraud) or may be selected by a consumer. These deterrent levels can determine the manner in which the transaction occurs as well as the types of information that must be provided and validated for successful approval of the transaction. The client can associate their credit card with a specific device, an e-identity, such as an instant messaging identity, and the e-identity is contacted as a part of finalizing a payment transaction so that a client response of 'approve' or 'reject' can be obtained. The anti-fraud technology also provides for management and storage of historical transaction information. Entity-to-client communication occurs according to merchant permission parameters which are defined by the client and which enable messages sent by the entity to be automatically allowed, rejected, and managed in other ways as well.

22 Claims, 21 Drawing Sheets

Related U.S. Application Data filed on Oct. 4, 2007, provisional application No. 60/980,498, filed on Oct. 17, 2007.

(58) Field of Classification Search
CPC ........... G06Q 20/4012; G06Q 30/0267; G06Q 20/02; G06Q 20/40; G06Q 30/0222; G06Q 20/08; G06Q 20/12; G06Q 20/32; G06Q 20/341; G06Q 50/265; G06Q 20/405; G06Q 20/322; G06Q 20/409; G06Q 20/10; G06Q 20/3821; G06Q 20/206; G06Q 20/3823
USPC .. 705/35, 38, 16, 26, 44, 39, 14.26, 18, 318
See application file for complete search history.

(56) References Cited

U.S. PATENT DOCUMENTS

| | | | |
|---|---|---|---|
| 7,263,506 B2 * | 8/2007 | Lee .................... | G06Q 20/04 705/318 |
| 7,376,431 B2 * | 5/2008 | Niedermeyer ............. | 455/456.3 |
| 7,594,605 B2 * | 9/2009 | Aaron et al. ................. | 235/380 |
| 7,600,676 B1 * | 10/2009 | Rados et al. ................. | 235/380 |
| 7,708,190 B2 * | 5/2010 | Brandt et al. ................. | 235/379 |
| 7,769,697 B2 * | 8/2010 | Fieschi et al. .................. | 705/72 |
| 7,778,935 B2 * | 8/2010 | Colella .................. | G06Q 20/04 235/380 |
| 8,224,753 B2 * | 7/2012 | Atef ........................ | G06F 21/34 705/64 |
| 8,656,458 B2 * | 2/2014 | Heffez .............................. | 726/2 |
| 2002/0032662 A1 * | 3/2002 | Maclin et al. .................. | 705/64 |
| 2002/0083010 A1 * | 6/2002 | Kim ................................ | 705/64 |
| 2002/0123938 A1 * | 9/2002 | Yu et al. .......................... | 705/26 |
| 2003/0069820 A1 * | 4/2003 | Hillmer ................ | G06Q 20/206 705/35 |
| 2004/0148256 A1 * | 7/2004 | Bramnick .............. | G06Q 20/04 705/40 |
| 2005/0160280 A1 * | 7/2005 | Caslin et al. .................. | 713/189 |
| 2006/0242049 A1 | 10/2006 | Haggerty et al. | |
| 2006/0248016 A1 | 11/2006 | Ginter et al. | |
| 2006/0248019 A1 | 11/2006 | Rajakumar | |
| 2006/0248586 A1 | 11/2006 | Delaney et al. | |
| 2006/0259304 A1 | 11/2006 | Barzilay | |
| 2006/0277148 A1 | 12/2006 | Thackston | |
| 2006/0278697 A1 | 12/2006 | Lovett | |
| 2006/0282381 A1 | 12/2006 | Ritchie | |
| 2006/0282382 A1 | 12/2006 | Balasubramanian et al. | |
| 2006/0282660 A1 | 12/2006 | Varghese et al. | |
| 2006/0285665 A1 | 12/2006 | Wasserblat et al. | |
| 2006/0287902 A1 | 12/2006 | Helsper et al. | |
| 2006/0293981 A1 | 12/2006 | McNelley et al. | |
| 2007/0005967 A1 | 1/2007 | Mister et al. | |
| 2007/0011104 A1 | 1/2007 | Leger et al. | |
| 2007/0016527 A1 | 1/2007 | Lyons | |
| 2007/0017974 A1 | 1/2007 | Joao | |
| 2007/0027807 A1 * | 2/2007 | Bronstein ........................ | 705/44 |
| 2007/0027816 A1 | 2/2007 | Writer | |
| 2007/0033106 A1 | 2/2007 | Mason | |
| 2007/0033139 A1 | 2/2007 | Handler | |
| 2007/0037552 A1 | 2/2007 | Lee et al. | |
| 2007/0038560 A1 * | 2/2007 | Ansley .................... | G06Q 20/10 705/39 |
| 2007/0038568 A1 | 2/2007 | Greene et al. | |
| 2007/0198410 A1 * | 8/2007 | Labgold ................ | G06Q 20/04 705/44 |
| 2009/0094126 A1 * | 4/2009 | Killian et al. .................. | 705/17 |

OTHER PUBLICATIONS

Messmer, E. (2001). Visa presses for e-comm security in wake of credit card theft. Network World, 18(11), 10. Retrieved from http://search.proquest.com/docview/215965430?accountid=14753 (1 page).*

* cited by examiner

The following item is being billed today:

Item XYZ: Website (link), Merchant (as it appears on your CC statement), Purchase Date, Amount, Billing Date (link), Date to Verify (link), Last 4 digits of credit card used, Strategic Marketing (link), item XYZ update (link), Recurring Billing license renewal reminder (link)

Item ABC: Website (link), Merchant (as it appears on your CC statement), Purchase Date, Amount, Billing Date (link), Date to Verify (link), Extended download service (link), Activation Code Received (link), Last 4 digits of credit card used.

Click here to Connect to FFT for online access to your account (link).
Click here to launch local FFT Control Panel Application.

FIG. 2d

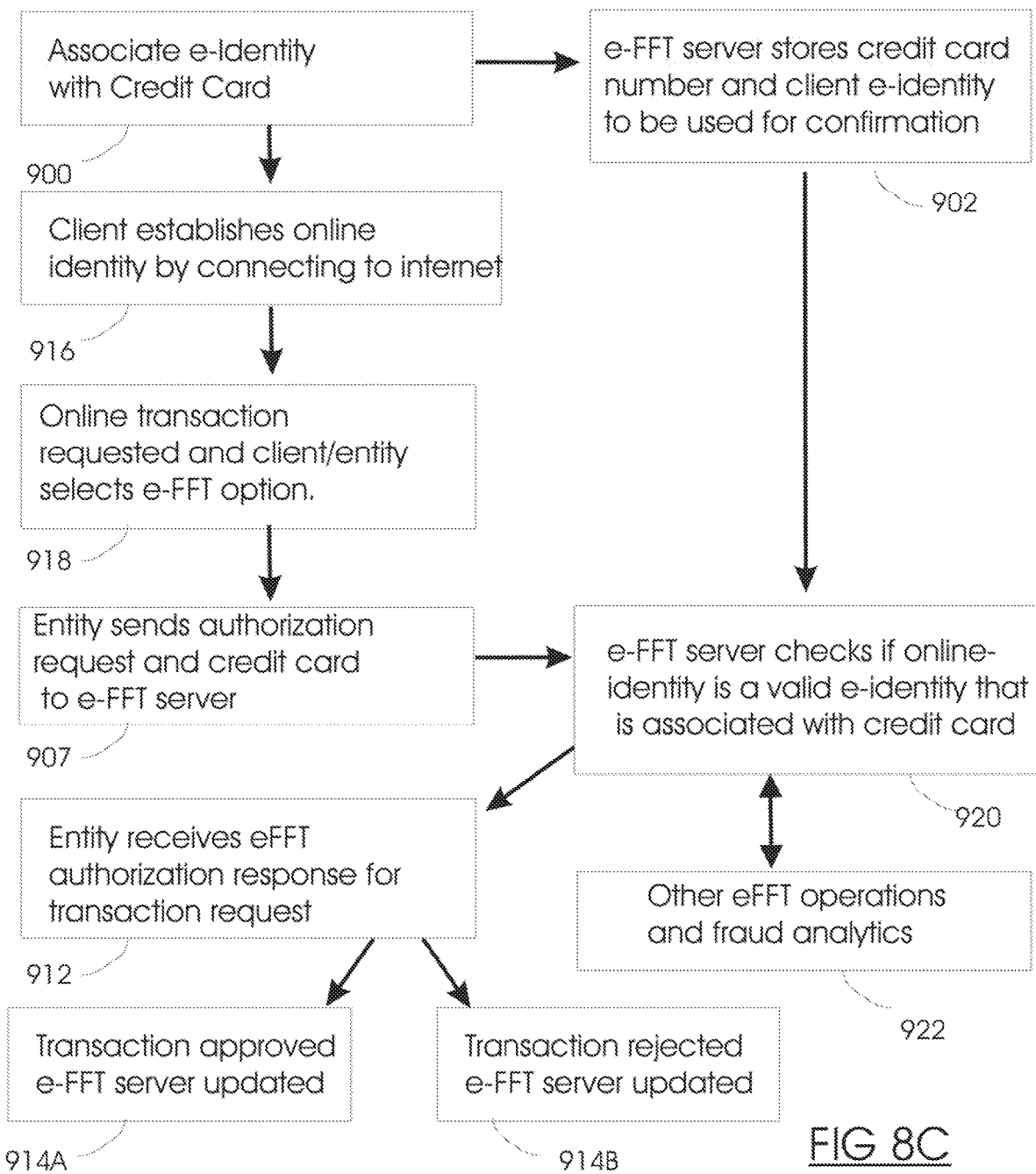

VISA Association and Verification

| N | Y | Validation Options | Validation Option Parameters |
|---|---|---|---|
| ☐ | ☐ | Verify by VISA  754 | 756 |
| ☐ | ■ | Verify by MSNMessenger | Mjohn@hotmail.com |
| ☐ | ☐ | Verify by YahooMessenger | |
| ☐ | ☐ | Verify by Gmail | |
| ☐ | ☐ | Permit transactions only from authorized computers  756A | 758A |
|   |   | 752  Computer-Name  Home Computer | Authorize  758B  Remove |
|   |   | Computer-Name | Authorize  Remove |
|   |   | Card-Numbers  Card Select/Remove | |

E-FFT e-identity Association and Verification

| N | Y | Validation Options | Validation Option Parameters |
|---|---|---|---|
| ☐ | ☐ | Verify by VISA  764 | |
| ☐ | ■ | Verify by MSNMessenger | Mjohn@hotmail.com  766 |
| ☐ | ☐ | Verify by YahooMessenger | |
| ☐ | ☐ | Verify by Gmail  764A | 766A |
| ☐ | ☐ | Text message to cell-phone. Password: 90210 | |
| ☐ | ☐ | Conceptual Password  764B | |
| ☐ | ■ | Permit transactions only from authorized computers 766B | 768A |
|   |   | 762  Computer-Name  Home Computer | Authorize  768B  Remove |
|   |   | Computer-Name  766C | Authorize  Remove |
|   |   | Card-Numbers  Card Select/Remove | |

AIRLINEUSA.COM Payment Verification Screen

N  Y    Validation Options
☐ ☐    Verify by VISA  774
☐ ■    Verify by MSNMessenger
☐ ☐    Verify by YahooMessenger
☐ ☐    Verify by Gmail
☐ ☐    Text message to cell-phone.
☐ ☐    Conceptual Password
☐ ■    Permit transactions only from authorized computers

772

Card-Numbers    [Card Select/Remove]    [xxxx xxxx xxxx 7623]
                         776                              778

Amount to be billed  [$574.88]    (Press to Confirm Payment)
                        780                          782
770

AIRLINEUSA.COM Payment Verification Screen

N  Y    Validation Options
☐ ☐    Verify by VISA  774
☐ ■    Verify by eFFT

772

Card-Numbers    [Card Select/Remove]    [xxxx xxxx xxxx 7623]
                         776                              778

Amount to be billed  [$574.88]    (Press to Confirm Payment)
                        780                          782
770

FIG 9D

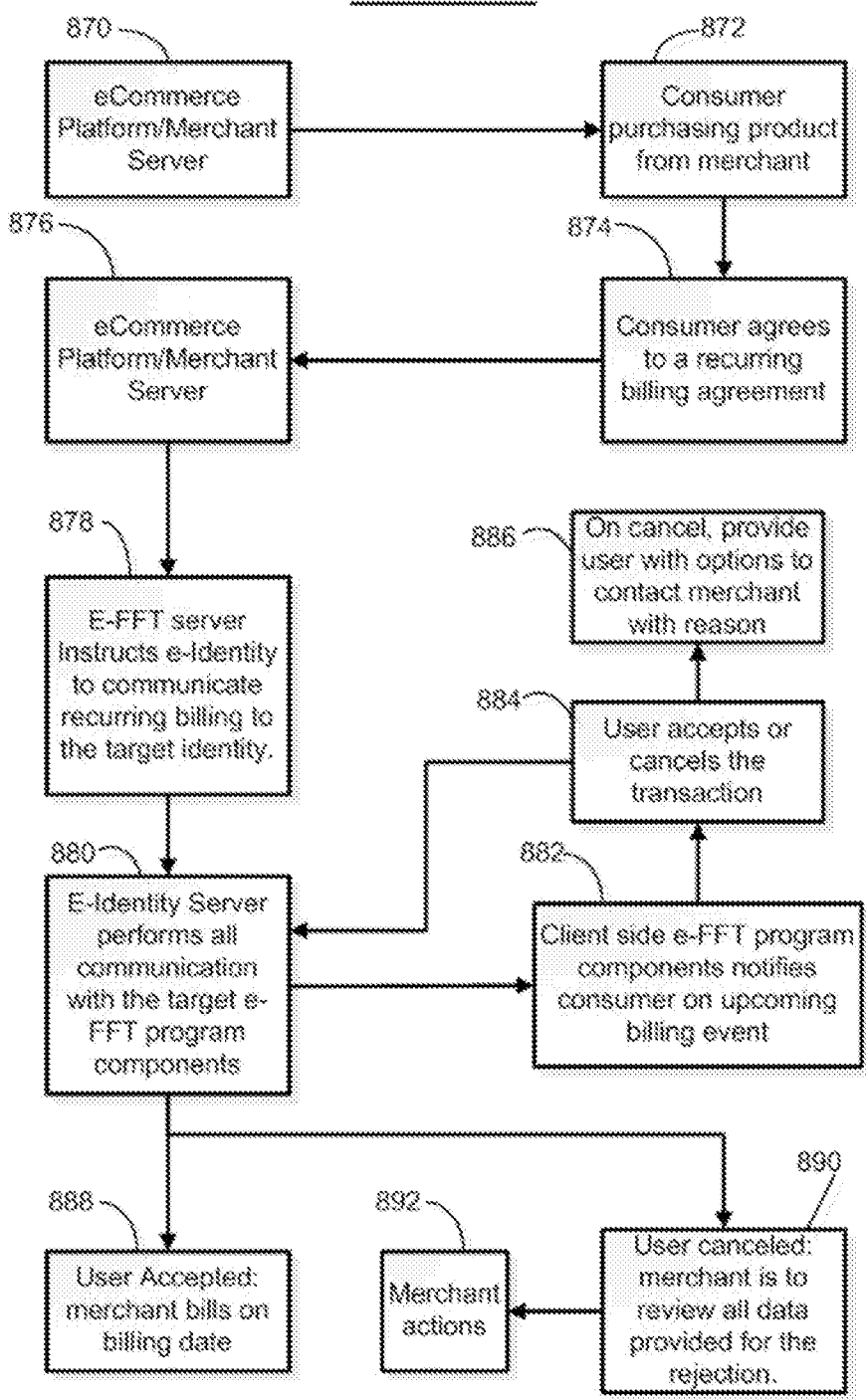

_US 10,853,855 B2_

SYSTEMS AND METHODS FOR AUTOMATIC AND TRANSPARENT CLIENT AUTHENTICATION AND ONLINE TRANSACTION VERIFICATION

This application relates to, and claims benefit of U.S. App No. 60/939,066 entitled 'Systems and Methods for Facilitating Electronic Transactions and Deterring Fraud' filed on May 20, 2007, and U.S. App No. 60/977,375 entitled 'Systems and Methods of Improved Payment Authentication for E-Commerce Transactions' filed Oct. 4, 2007 which describe further embodiments of FFT systems and methods and U.S. App No. 60/980,498, entitled "Systems and Methods for Automatic and Transparent Client Authentication" filed on Oct. 17, 2007, and relates to U.S. application Ser. No. 12/115,538 entitled "Systems and Methods for Facilitating Electronic Transactions and Deterring Fraud" all of which are incorporated by reference herein.

FIELD

The present invention relates to the field concerned with performing user authentication, as well as fraud detection and prevention in electronic transactions. The invention also relates to the facilitation of digital rights management, licensing, and payments related, but not limited, to procuring digital media and its use over time.

BACKGROUND OF THE INVENTION

E-commerce is analogous to a marketplace on the Internet, also referred to as the the World Wide Web. E-commerce primarily involves the distributing, providing, buying, selling, marketing and servicing of products or services over electronic network systems such as the Internet and other computer networks. E-commerce provides many advantages to both consumers and sellers by reducing costs, sometimes sales tax, and increasing convenience. For example, online sales can take place at any time without requiring that the consumer and seller be in the same physical location, E-commerce involves new concerns since it turns the traditional 'card present' transaction into a 'card not present' transaction. Further, the seller and consumer do not actually 'see' each other. This means that the identity of the parties executing the e-commerce e-transaction can not be verified easily for either the seller or the consumer, neither of which may know or trust the other. Unfortunately, there exists an increase in the number of incidents in which e-commerce sellers are being targeted by fraudulent consumers with stolen credit cards, resulting in both monetary as well as product losses. Additionally, fraudsters can create legitimate looking e-commerce sites where they lure innocent consumers into using their credit/debit cards to buy merchandise which does not exist. In this case a real transaction does not occur, and further the fraudster may have gained not only payment but also all of the necessary information from the consumer to perform subsequent e-commerce fraud.

Solutions are needed to combat fraudulent activity with respect to real-world transactions, electronic transactions in general and e-commerce in particular. Successful solutions should not become a burden to the card issuing institution/banks, payment service providers, sellers or consumers. Solutions should not greatly increase the time or effort required to complete the transaction, and should provide sufficient benefit to both parties so that they have incentive to accept the solutions into their normal activity. If some of the features of this invention are adopted/supported by either consumer's credit card issuing institutions/banks, payment service provider, or credit card associations then these solutions can be easily introduced to their customers as well as merchants who process these respective payments. The features described herein are readily adaptable and can be realized as most widely accepted payment methods.

Straight-forward systems and methods are disclosed which enable consumers to easily link their credit/debit cards to devices of their preference. By doing so, various e-identities can be established and clients can join a 'Fraud Free online community'. For transactions to be finalized, the credit/debit card issuing entity/bank, can send a notification/verification request to the consumer, in real-time, who may then approve or reject the request. This system will save millions of dollars for card issuing institutions/banks, payment service providers, merchants, and credit card associations in expenses related to charge backs, expenses related to human based fraud prevention and deterrence, and loss of productivity and sales. The participation, of only one e-commerce site (e.g. www.paypal.com; www.googlecheckout.com; www.msn.com; www.apple.com/) can enable these features to provide a large number of benefits to its clients. The disclosed features can be implemented within a particular commercial entity and/or using a $3^{rd}$ party service which provides the fraud deterence service (e.g. www.fraudfreetransaction.com), in order to allow secure transactions to occur.

SUMMARY OF THE INVENTION

An electronic fraud detection and prevention system is disclosed. The system may be realized having a credit-card issuing institution/bank-side server or a payment service-provider-side server (which can be referred to herein as an eFFT-entity-side server), a merchant-side server, and a consumer-side application, which communicate through an electronic fraud tree transaction (eFFT) network before, during and/or after an e-transaction (referenced in this application as e-transaction or e-commerce). One fraud prevention feature resides on the consumer-side application and provides a user, or the user's bank, with the ability to select a level of fraud protection that is executed during an e-transaction. The eFFT-entity-side server includes a fraud deterrent software module that can communicate, via a network, with consumer-side applications that reside on end user machines. The consumer side application can engage the seller platform during execution of online e-transactions, and/or communicate with an eFFT-entity-side server application that is associated with the credit card used to execute the e-transaction.

A fraud prevention feature is provided by the eFFT-entity-side server and uses at least some of; (a) pre-registered consumer credit/debit card number; (b) the consumer's preferred unique device/s identification; (c) the current IP address associated with the unique consumer device; (d) the consumer's credentials. Some or preferentially all of these are used by the eFFT-entity-side server to perform user authentication, and transaction verification in real time.

A fraud detection feature is provided by the seller-side server and uses at least one of: (a) fraud prevention settings set by the consumer-side application or card issuing bank; (b) a plurality of parameters that are retrieved during the consumer interaction with the e-commerce platform some of which may determine if the transaction is allowed; and (c) a plurality of parameters that relate the transaction details to the probability of either the transaction being fraudulent or resulting in the occurrence of a future charge-back. Additionally, the seller-side server includes a software module that provides an e-commerce platform with the ability to transfer e-transaction details to a local or a remotely located fraud deterrent server and receives in return likelihood/probability of fraud and likelihood/probability of charge back analysis results. These results are then used to accept reject, or push the e-transaction into manual review that is performed by a human operator.

Also provided, is a method, performed by the electronic fraud detection system residing on the seller-side server, for analyzing the likelihood/probability of an e-transaction to be fraudulent or to be charged back. The server includes an interface for the e-commerce platform business owner, or subscribing sellers, to set key performance indicators, and business rules to govern the performance of the electronic fraud detection and prevention system. The server includes an interface that is accessible using the internet for consumers to access their online transactions history directly in order to view their past transactions and adjust their fraud level profile settings according to their needs, purchases, or preferences.

Also provided are methods for allowing clients identification to be validated, and for the validated client to link an e-identity with a credit/debit card, and for the merchant to then contact this e-identity as part of a transaction process so that the client may approve or reject a transaction.

The invention relates to controlling (e.g., allowing the client to control) the notification which occurs between merchants and clients. The invention also relates to permitting payment by proxy, using temporary credit card numbers which may be selected automatically by the disclosed invention.

Also provided are methods for providing eFFT entity-to-client, client-to-eFFT entity, merchant-to-client and client-to-merchant communication to occur securely and according to a client's (or eFFT entity's, merchant's) preferences, and this communication can also include requests for approval of recurring billing amounts, information relevant to past transactions, and other information as well.

The fraud deterrent features can be provided as part of a digital shopping cart. Facilitation of digital rights management, licensing, and payments related to procuring digital media, and its use over time, is achieved using client-side software which is operated on the client's computer under the permission of the client. The fraud deterrent features can be operated, for example, as a notification module, on, or by, a remote service to which the client subscribes or is a member, such as a social/professional network group.

These and other preferred features and embodiments of the invention are described in detail and will become further apparent within the detailed description and appended claims.

DESCRIPTION OF THE DRAWINGS

The accompanying drawings constitute a part of this preferred specification and together with the description explain the principles and advantages of the invention. In the drawings.

FIG. 2d is an exemplary user interface displaying configurable user information regarding pending, and past online e-transactions with relevant data points.

FIG. 8C is a flow chart of an exemplary process which is accomplished within a Fraud Free Transaction Network system which provides authentication operations based upon a client's temporary e-identity which is established by a service provider.

FIG. 9A is an association and verification screen which is presented by a bank or card service and which is used to associate an e-identity with a credit card.

FIG. 9B is a association and verification screen which is not presented by a bank or card service, but rather at $3^{rd}$ party eFFT service, and which is used to associate an e-identity with a credit card.

FIG. 9C is a payment verification screen provided by a merchant which allows a client to designate what e-identity should be used to obtain client approval for the purchase using a particular card.

FIG. 9D is an alternative payment verification screen provided by a merchant which allows a client to designate that the eFFT system should be used, authenticate the purchase using a particular card.

FIG. 12C is a flow chart of an exemplary eFFT-based method which permits requesting client approval for recurring billing events.

DETAILED DESCRIPTION

Reference will now be made in detail to the presently preferred and exemplary embodiments of the invention which are also illustrated in the accompanying drawings.

Figure 1A:
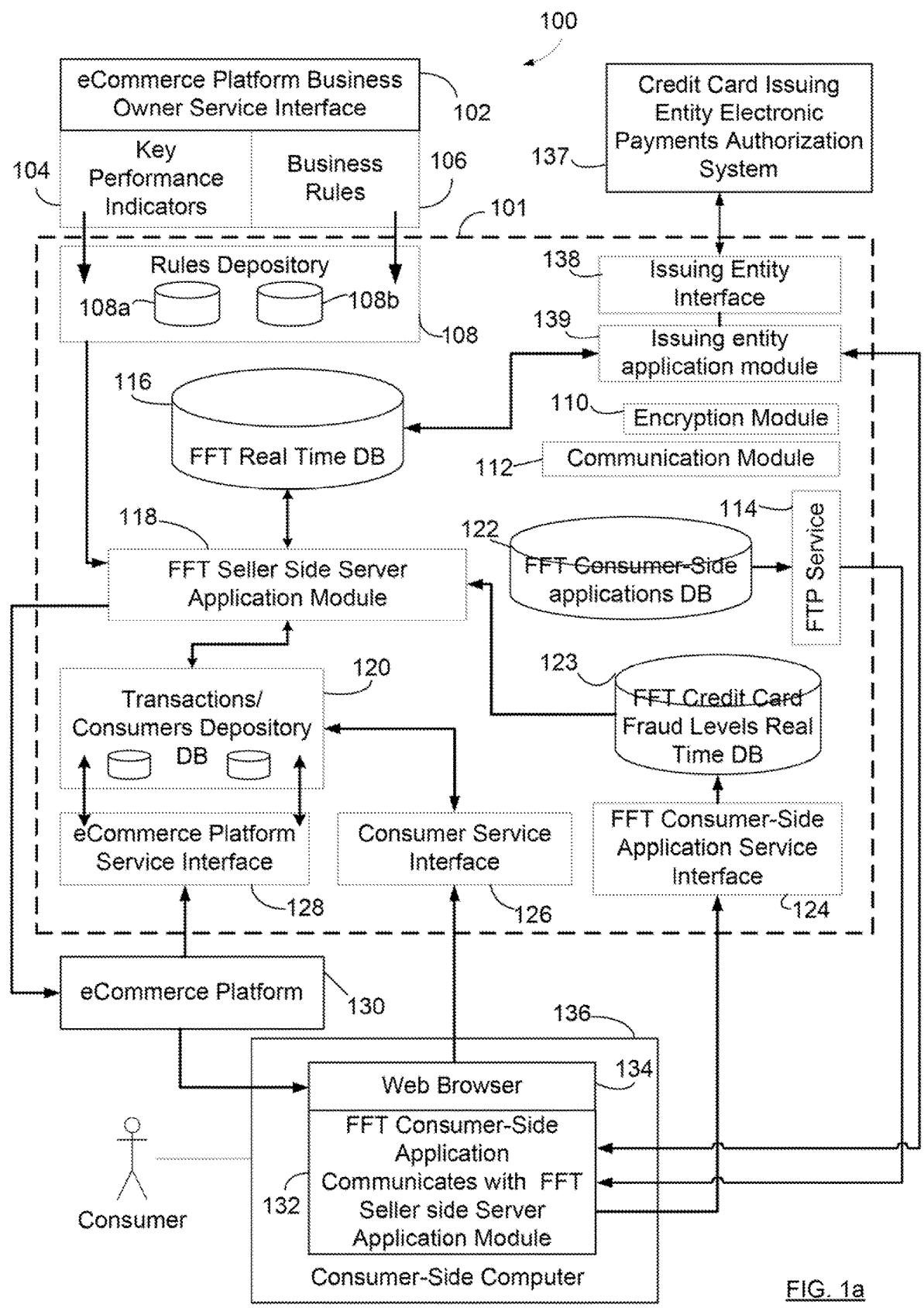
FIG. 1a is an exemplary schematic overview of a Fraud-Free Transaction System that provides an environment for Fraud Free transactions.

FIG. 1a shows a diagrammatic overview of a Fraud Free Transaction (FFT) system 100 which enables interaction between a client's computer 136, a credit/debit card issuing institution, 137, an eCommerce platform 130 and a FFT Seller-Side Server 101 having a plurality of software modules and related databases. The computer 136 can be a desktop, laptop, or handheld computer, a cell-phone, a cellular PDA, or other device which can be used to link to the internet. An eCommerce platform 130 can communicate with the eCommerce Platform Service interface 128 using standard internet protocols and can transfer e-transaction parameter values to the FFT Seller-Side Server 101. Information can be stored within the History Transactions/Consumers Depository DB 120. The FFT Seller-Side Server Application Module 118 can determine if a credit/debit card provided by a consumer during a transaction is associated with a FFT Consumer-Side Application. The determination is performed by checking the card number against a FFT Consumer Credit/debit Card Fraud Protection Level Real Time DB 123 which stores in an encrypted format all FFT Consumer-Side Application card numbers that have been used to purchase items from one or more sellers in the past.

The FFT Card Fraud Levels Real Time DB 123 is updated every time a consumer registers a card as may occur using a consumer-side application, a seller-side FFT application, or using a "FFT-Center" web site (e.g. which may be provided from the consumer's credit-card issuing bank account management area on the client's bank website), in the case where an e-Commerce platform of the seller does not use the FFT technology, a benefit from the user registering their card through a credit card issuing bank is still derived with respect to the card's owner. In this latter case, the credit card issuing bank will, due to the transaction taking place, receive a credit card authorization request from an internet merchant. The issuing bank can then verify whether or not the credit card owner is an FFT registered user. If this is the case then the bank can authenticate the user and verify the transaction in real lime by communicating with a consumer-specific registered device from which the transactions have been allowed to originate by the consumer. In this case, the credit card issuing bank will initiate this real time contact from within the Credit Card Issuing Entity Electronic Payments Authorization system 137. The request will reach the FFT Issuing Entity Interface 138, and the relevant information will then be used by the Issuing entity application module 139 to verify that the credit card being used is associated with a user, and a device by looking this up against the FFT Real Time DB 116. In the case that a user/device exists, the Issuing entity application module will execute the contact operation to authenticate the user and verify the transaction in real time by calling the target FFT consumer-side application 132 on the preferred device 136. The response from the user (or lack of such a response) will determine whether to approve or decline the authorization request.

In each of these cases all communication of the data is perforated securely and in encrypted format via the Communication Module 112. The purpose of the fraud-check can be to determine if the transaction is allowed using the credit card in the context of the level of fraud protection that was previously set and is controlled by the credit card owner, bank, or FFT service (e.g., the user must be required to use a particular computer which has been registered with the FFT service). For example, if the consumer is a FFT participant and the credit card supplied for the transaction is allowed by the FFT server in relation to the level of fraud protection set by the credit card owner, then the transaction can be allowed: however different fraud protection levels may be set for different users and purchase types/values. In one preferred embodiment, the Seller-Side server can verify the credit card being used not only locally against the Seller-Side server but against a remotely located third party FFT Central web site 149 (of FIG. 1b) that can store additional credit cards for the current consumer and as well as other consumers who are FFT participants. This feature provides an additional verification and validation method to assess the current credit card being used with seller eCommerce platform during the current e-transaction. This method is beneficial for merchants/sellers especially in cases where the FFT enabled credit card is used for the first time on their eCommerce Platform but already has a historical record of successfully being used on other eCommerce platforms (and possibly with the same device/computer, or same shipping information). Cards which have been used often in a similar way (e.g. similar website, similar purchase type, and with a regular frequency) may be approved quicker than cards which have historically sporadic purchase activity.

Alternatively, if the consumer (or at least the credit card used) is not that of an FFT participant, then the ease can be processed differentially. In this case the FFT Seller-Side Server Application Module 118 will process the e-transaction in a standard manner. For example, the server may calculate the risk of fraud and performs a Charge back analysis using the FFT Real lime DB 116. In this ease the transaction may still be allowed but it is designated as a higher risk transaction solely by the mere fact that the consumer is not a FFT participant. A stronger, or at least differential type of, analysis and scrutiny may be implemented in an effort to prevent fraud, in this case, the latter involves the use of automated analysis performed by the FFT Seller-Side Server Application Module 118 to determine whether to automatically accept, automatically reject and/or possibly introduce the intervention of a human operator for manual review of the transaction. Using the FFT System 100 can not only decrease fraud but also serve to introduce millions of dollars of savings in the operational expenses related to a seller's fraud department. For example, by strategically assigning manual review, the fraud operator workload is reduced significantly. Additionally, the mere knowledge of an incoming transaction as being one from a FFT user/credit card can indicate to the merchant/seller that this transaction can be fully processed since the credit card issuing bank will be performing the final user authentication and transaction verification (and in some cases the bank may send confirmation to the seller that it has done so using real-time methods of communication between the bank and seller server). The addition of an FFT Seller-Side Server, which decides the outcome of orders from: consumers that are FFT participants, consumers who reject being FFT participants, and information provided by FFT consumer side FFT applications, can assist in a fraud operator's performance since orders which are manually reviewed may be assisted by obtaining this preliminary information.

The FFT Seller-Side Server Application Module 118 can assist in deterring fraud by performing periodic automated data analysis to update weights and or scores for e-transaction parameters. This may occur by operating the FFT Seller-Side Server Application Module 118 so that it compares all incoming e-transaction parameters against FFT Real Time DB 116 and provides decisions to accept, reject, or push the transactions for manual review that is performed by a human operator. FFT Seller-Side Server Application Module 118 updates FFT Real Time DB 116 with new fraud risk values and Charge-back risk values for each e-transaction parameter that is associated with every incoming e-transaction. An eCommerce platform business owner can communicate with the eCommerce platform business owner service interface 102 and upload Key Performance Indicators 104, and/or Business Rules 106 that are stored in the respective Rules Depositories 108*a* and 108*b* and can guide and/or control the performance of the FFT Seller-Side Server Application Module 118. For example, the business rules determine the thresholds by which e-transaction parameters are weighted and the method by which, the decision to accept, reject or push into manual review is reached; new products that are introduced by the seller and which are thought to be high risk products, can have a custom weight or score which initially forces these to be manually reviewed. Alternatively, when existing products are acutely being targeted by fraud users, the seller can also direct the FFT Seller-Side Server to directly push the latter into manual review. All incoming e-transaction parameters/ data points are encrypted by the Encryption Module 110.

All Communication between the FFT Seller-Side Server Application module 118 and the FFT Consumer-Side Application 132 as well as the communication between the FFT issuing entity application module 139 and the FFT Consumer-Side Application 132 is performed via the FFT Communication Module 112.

In one preferred embodiment, the Credit Card issuing Bank application 137 can utilize the Issuing bank interface 138 to transfer information relating to new credit, cards that are FFT participants. This can be done manually by an issuing bank human operator who uploads a batch file that is encrypted and transferred to the Seller-Side server or via an automated method performing the above procedure.

The file transfer protocol (FTP) Service 114 function provides the capacity to download the FFT Consumer-Side Application 132 onto the consumer's computer 136. Although the term "computer" is used both here and elsewhere in this specification, this term refers to any device used by the consumer to conduct e-commerce can be a phone or Blackberry™ type of device which may have/use/ communicate with a hardware chip such as an RFID device or processor with unique identification information such as TPN. If a user uninstalls the FFT Consumer-Side Application 132 from the consumer's computer 136 or buys a new computer, the consumer can subsequently download a new copy of the FFT Consumer-Side Application. Additionally, the availability of the Consumer Service Interface 126 can provide the consumer with access to some or all FFT Consumer-Side Application 132 data and features as well as a limited or full e-transaction history and details. One benefit for credit card issuing banks and Credit card associations who sponsor the FFT system 100 is that by providing their clients (credit card owners) with a customizable tool that enhances and increases security in online e-transactions, the level of trust and comfort of these consumers will, increase with respect to purchasing items electronically. Increasing valid e-transactions will increase revenue for credit card issuers, credit card associations, and online merchants. Another benefit of the fraud prevention functionality introduced by the FFT system is that it can provide credit card issuing banks, and merchants with savings that are measured in the millions of dollars in annual chargeback costs, insurance costs, and lost productivity.

Figure 1B:
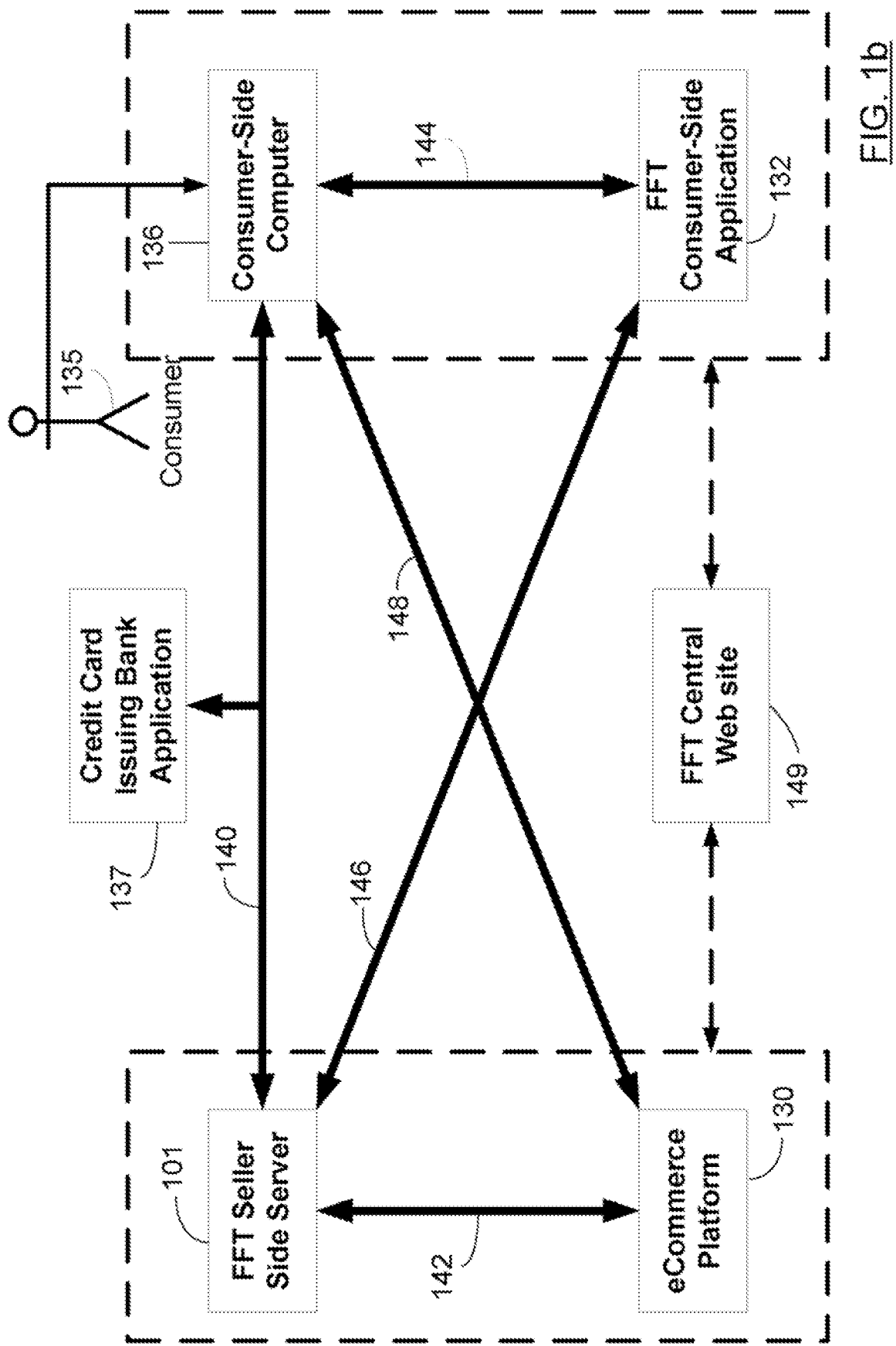
FIG. 1b is a block diagram which illustrates the interaction between all parties involved in the environment enabling a Fraud Free Transaction.

FIG. 1*b* shows a diagrammatic overview of the interaction between the different components of FFT System 100. A consumer 135 on a Consumer-Side computer 136 who wishes to make an electronic purchase can use a computer to interact with a seller via an eCommerce Platform 130 using standard internet communication protocols and the internet to make connections 146, 148. If the consumer has previously agreed to register and install the FFT Consumer-Side Application 132, which may be offered by their credit card issuing bank; on the consumers' computer 136 then the consumer can interact, with the FFT Consumer-Side Application 132 using its graphical user interface communication 144. Accordingly, the consumer can set FFT related parameters, such as the level of fraud protection to be used for the current online transaction, as well as future transactions. The FFT Consumer-Side Application 132 can communicate using standard internet protocol connections 146 with the FFT Seller-Side Server 101 if the seller/merchant is hosting the FFT Seller-Side server or subscribing to this service and communicates and provides authentication using the level of fraud protection that the consumer has previously configured using the FFT Consumer-Side Application 132, or using a web interface that allows customization of the FFT validation. The consumer can also access the FFT Seller-Side Server 101 directly using standard internet communication protocols via the internet 146 and can update the level of fraud protection that is associated with the FFT Consumer-Side Application 132 directly on the FFT Seller-Side Server within a consumer profile. In this preferred embodiment, the consumer can set specific fraud protection levels and settings with a merchant with whom many past and future transactions have been, or will be, to be executed. The FFT Seller-Side Server 101 will automatically communicate any changes in parameter settings to the FFT Consumer-Side Application 132 using internet communication protocols 146, so that the merchant specific profile settings on the seller's server and the settings associated with that specific merchant on the consumer's computer are in accordance. In one preferred embodiment the consumer can access an FFT-Central Web site 149 and change various parameters associated with a specific FFT consumer-side application, or for all consumer-side applications on devices which are associate with a consumer's profile (i.e. a consumer may use more then one FFT consumer-side application on more then one device).

All of these changes can be communicated to each Seller-Side server 101 on every eCommerce Platform 130 which is engaged in the FFT, or only for those that the FFT consumer-side application is identified to have previously interacted. On the eCommerce platform 130, each transaction that is accomplished by a consumer who is a FFT participant will be verified against information from the FFT Seller-Side Server 101 that has been associated with the respective FFT Consumer-Side Application. These operations can be managed according to the level of fraud protection associated with, and/or selected by, the consumer 136 who initiated the e-transaction. Additionally, a multitude of analysis tasks and actions can also be performed for every incoming transaction processed by the FFT system 100.

An FFT system can enable an e-transaction method in which the FFT Seller-Side Server first checks if the consumer computer hosts the FFT Consumer-Side Application (e.g., by attempting to establish communication or checking for a cookie). Based on the detection routine results (e.g., the FFT Consumer-Side Application is not detected), the consumer can be presented with the opportunity to allow or reject the implementation of a fraud free transaction by selecting a graphical control. Once implemented, the FFT applications can track all current and future e-transactions 820 performed by the consumer on every eCommerce platform that hosts the FFT system 100 as a service. This is an advantage to a consumer because this method, provides the consumer with an easy access to historical e-transactions details that were settled with each eCommerce platform or seller that hosts the FFT service. Additionally, the consumer is provided with a reconciliation method for all products and associated payments that are received by the consumer for various methods that payment associations use to provide the consumer with statements of activity.

A seller can benefit from the e-transaction history information that is stored in the corresponding Transactions/Consumers Depository DB on the FFT Seller-Side Server in order to determine over time and with a high degree of confidence if a specific consumer who is a FFT participant is a fraud free and or charge back free (mostly) consumer. Additionally, the information in the Transactions/Consumer Depository DB can be used for strategic marketing targeting FFT participant consumers both the seller and consumer can derive benefits from adopting FFT systems and methods. Farther, since a user's computer/device information can be associated with a credit card, it is difficult for a Fraudster to attempt to use multiple credit cards from the same computer/device, or to continue to use the same computer after it has been used for a fraudulent transaction, or to use a credit card that has already been associated with a different computer. In all of these instances the seller-side Application or Credit-issuer-side Application will easily detect and prevent fraudulent activity.

Figure 1C:
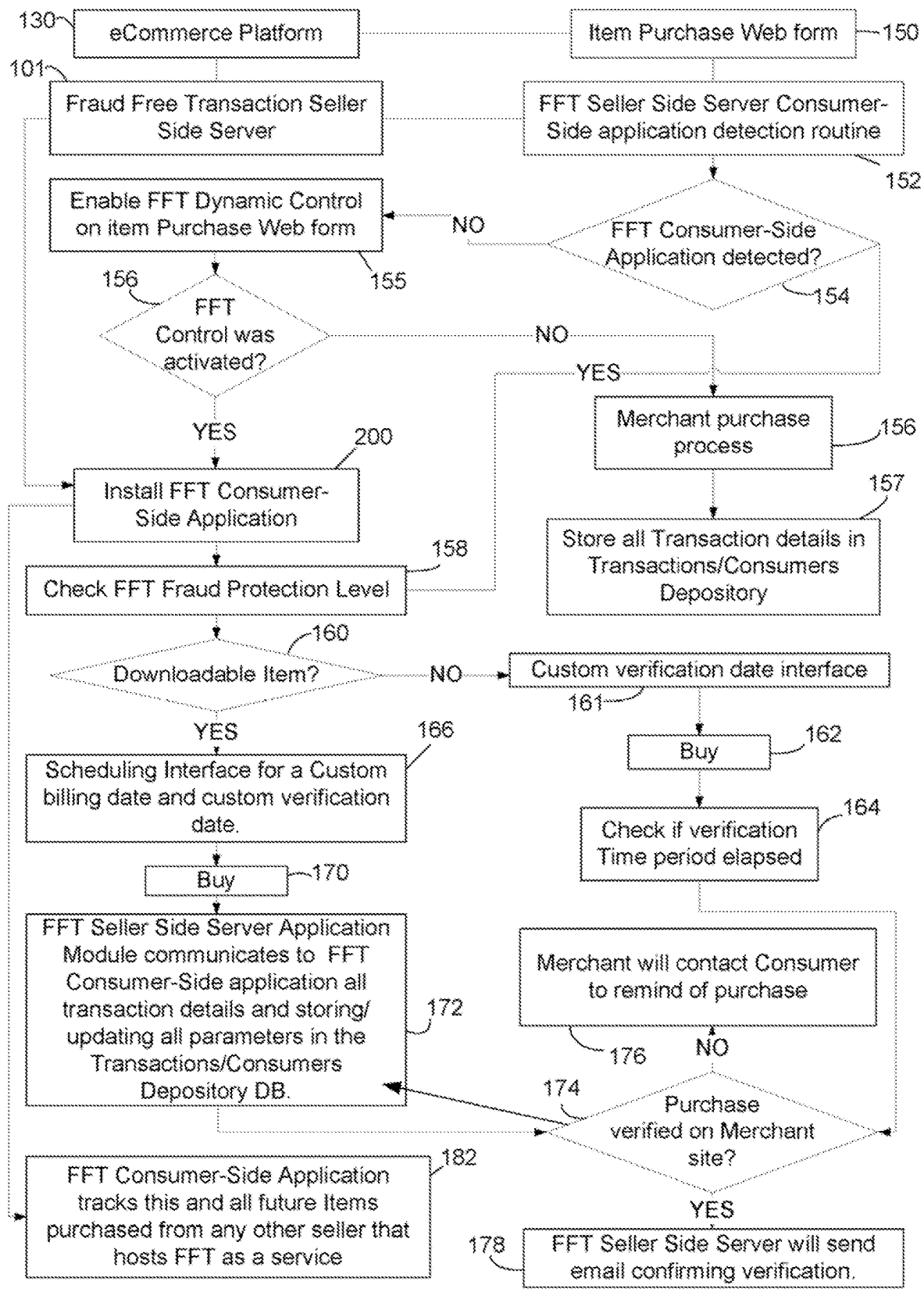
FIG. 1c is a flow chart of a method of processing an e-transaction in a Fraud Free Transaction enabled environment at a fraud free transaction enabled merchant.

As shown in FIG. 1*c*, an eCommerce Platform 130 that hosts the FFT system 100 as a service can include a program configured to add the 'FFT Dynamic Control' onto a web form which is presented by the eCommerce platform. The web form is intended to enable purchasing to occur in combination with a consumer's selection to either participate or not participate in a fraud free transaction by selecting the FFT Dynamic Control that is presented by the eCommerce Platform on the item purchase form 150. Additionally, the eCommerce Platform 130 will have a program that sends a request to the FFT Seller-Side Server 101 to perform a Consumer-Side Application detection routine 152. If the detection routine does not detect the FFT Consumer-Side Application on the consumer computer, the eCommerce Platform will then activate the program that enables the FFT Dynamic Control on the item purchase form 155. If the consumer 'activates' the FFT Dynamic Control 156 then the Installation of the FFT Consumer-Side Application on the Consumer's computer 200 can initiated (either locally or by referring a consumer to FFT-participating bank websites), and may occur after additional consumer customization and confirmation activity. Such installation can entail a temporary consumer-side installation(s), the installation of a program which then customizes the FFT application installation, provision of a browser plug-in, and the like. During or immediately after installation is complete, the FFT Consumer-Side Application can request that the Consumer Set the FFT Fraud Protection level. After setting of the FFT Fraud Protection level by the consumer, the FFT Seller-Side Server will check the FFT Fraud Protection level 158 as it was set on the FFT Consumer-Side Application leading to a respective adjustment of a 'level' parameter value that is associated with the FFT Consumer-Side application on the FFT Seller-Side Server. The FFT Seller-Side Server will update the Fraud Protection level that is associated with the FFT Consumer-side application for that particular consumer according to any change of the Fraud Protection level that is performed by the consumer on the FFT Consumer-Side application. This may also be done directly on the FFT Seller-Side Server using a secure connection on the internet. After installation of the FFT Consumer-Side application, all current and future transactions with the present eCommerce platform, and any other eCommerce platforms, and sellers that host the FFT service may be tracked 182. Additional steps can be added to this method, for example, the consumer may associate various consumer-side applications on different computers with an FFT profile. Also, rather than trying to automatically detect if a consumer has an FFT application already installed on their computer, the consumer may be asked if this is the case as part of the web-form which is related to the e-transaction. When this is the case the transaction may be differentially conducted.

Rather than being installed as a plug-in for a browser or a client-side application that works independently from a web-browser, the FFT client-side application can be realized as a secure internet crippled browser application wherein the user can not browse the internet but rather use only a limited set of available controls and features offered by the crippled browser application. This crippled web-browser is especially configured, for electronic transactions using FFT features. The FFT-based crippled web browser may establish secure communication with banks and certified merchants, and may be associated with a particular credit card, or type of credit card, and also shipping address or computer identification information.

If the consumer is executing an e-transaction of a purchase which entails buying Electronic Media 160 that can be immediately downloaded, then the FFT can provide a scheduling interface 166 for allowing the user to select at least one of a custom billing date and a custom verification date (as well as activation date or date when license code will be sent as will be described later). Some of the benefits of these two types of dates will be explained in accordance with FIG. 4.

After the selection of these dates is complete the consumer is allowed to complete the purchase 170. As the transaction is completed the FFT Seller-Side Server communicates to the FFT Consumer-Side Application and stores and or updates in Transactions/Consumers Depository on the FFT Seller-Side Server 172. This can include all details of the transaction, including order details, custom billing and verification dates, as well as parameter values related to FFT related measures, such as the fraud level used by the consumer during the transaction. The consumer then has an easily accessible record, a historical database of transaction details that is stored locally on the consumer computer. This can also occur as well on remote FFT-servers. While the historical database record which is stored on the consumer's computer may be password or otherwise protected, it may normally be configured to hold information that is not excessively enabling to users that are not the consumer. For example, only portions of serial numbers, access numbers, license codes, or credit card numbers may be displayed or stored. The consumer, bank, and/or seller can customize the types of information which are displayed and stored by the FFT technology: the display preferences can be programmable and adjustable.

In some instances the electronic transaction includes an electronic purchase in which the consumer has purchased items which are not electronic media 160 and which need to be shipped. In this case, the consumer can be presented with a Custom verification date interface 161 which is presented to the consumer. After selecting the verification date, the consumer can then buy the item 162. The FFT Seller-Side Server application will then monitor and assess whether the verification time period for a particular item has elapsed 164. If the verification time-period has elapsed, and the purchase is verified on the seller site 174 successfully by the seller site, then the FFT Seller-Side Server performs 'verification successful' operations such as sending an e-mail confirming this successful verification 178. If the purchase is not verified successfully on the merchant site 174, then the FFT Seller-Side Server can schedule 'verification felled' operations. For example, the transaction can be pushed to a human-contact process of the merchant so that a customer service representative will contact consumer using standard communication methods (e.g., e-mail or phone) to remind or enquire the consumer about the transaction. In both cases where the transaction is verified successfully or is not verified, this information is updated and stored on the FFT Seller-Side Server Transactions/Consumers Depository 172. If the FFT object is not selected by the consumer 154, then the original merchant purchase process can be relied upon 156. In this later case the transaction parameter details can still be stored in the FFT Seller-Side Server FFT Transactions/Consumers Depository 157 so that this information is included in the historical record of reference that may be used to detect and deter fraud.

Figure 2A:
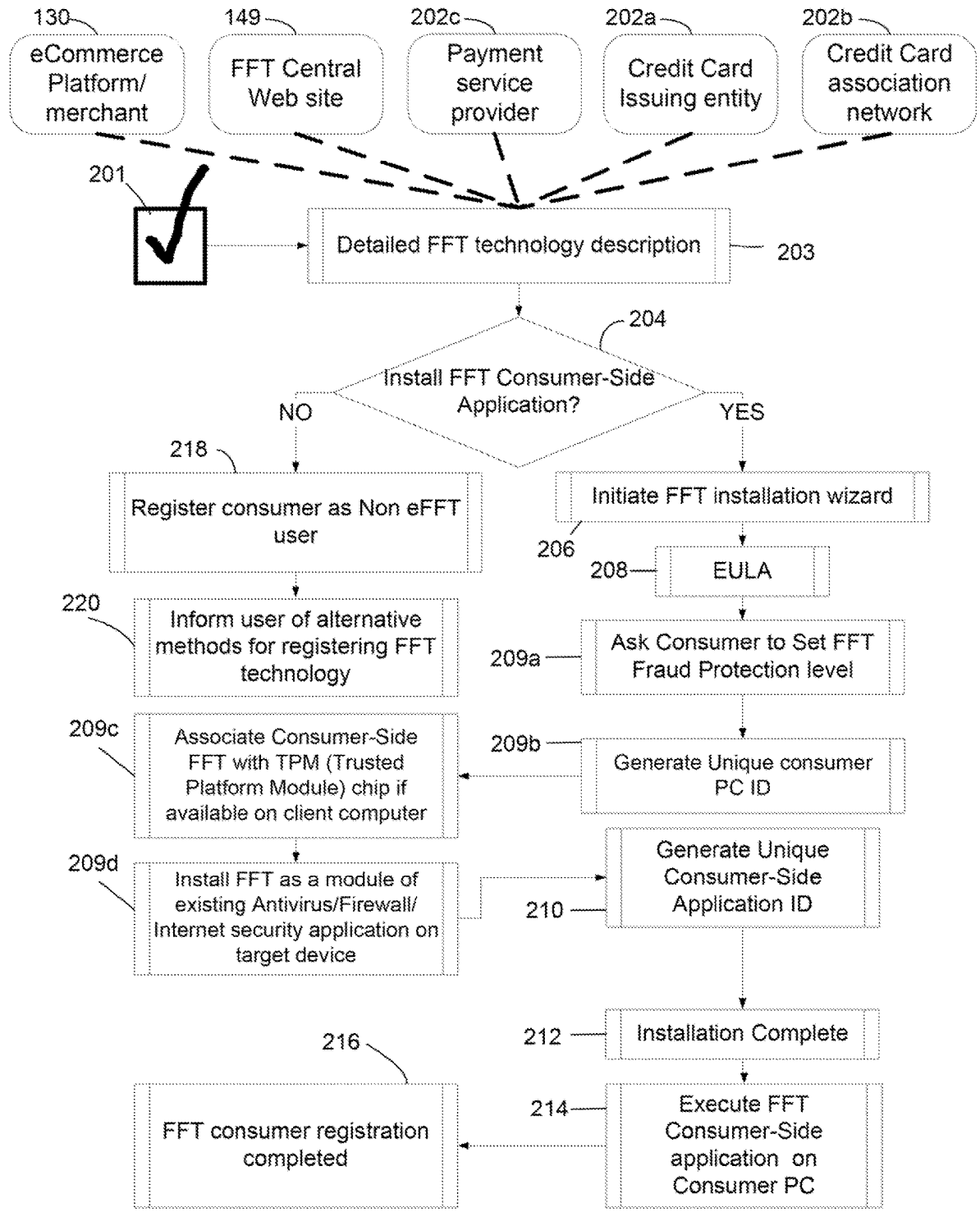
FIG. 2a is a flow chart, of Fraud Free Transaction consumer registration and client application installation process.

FIG. 2*a* is a diagrammatic chart depicting an installation process of the FFT Consumer-Side Application 132 (of FIG. 1*a* and FIG. 1*b*). In one preferred embodiment, the availability of the FFT consumer-side application 132 can be on the eCommerce Platform 130 (of FIG. 1*a*), the FFT central web site 149 (of FIG. 1*b*), a credit card issuing bank website 202*a*, or a credit card association like VISA, MasterCard, or American Express or other credit card association network 202*b*, or a Payment service provider like paypal.com or googlechechkout.com 202*c*. A selection of a dynamic control 201 that can be available on every one of the web sites mentioned herein indicates the willingness of a consumer to participate in a Fraud Free Transaction and/or register as a participant. If the consumer selects the FFT dynamic control 201, indicating a willingness to participate in a Fraud Free Transaction, then a pop up dialogue with a detailed description of FFT technology 203*c* can be presented either preceding or concurrent to actions related to the installation of the FFT Consumer-Side Application 132 on the consumer's computer 136. In the illustrated embodiment, if the consumer selects to Install FFT Consumer-Side Application on consumer computer 204, the FFT installation wizard will be invoked 206 followed by a presentation of the End User License Agreement (EULA) 208. Following the EULA, the installation wizard will ask the consumer to set a FFT Fraud Protection level 209*a* or otherwise customize the validation/authorization features of the FFT. In one preferred embodiment the FFT consumer-side application will generate a unique ID associated with the current consumer device that is interacting with the target entity 209*b* in one preferred embodiment the user can associate the Consumer-Side FFT application with the on board TPM (Trusted Platform Module) chip 209*c*, if one exists on the target consumer device. In another preferred embodiment the FFT consumer-side application can be associated with or become an add-on component to existing consumer eCommerce capable application like Microsoft MediaPlayer, Apple's iTunes, and/or any other consumer applications that have the capability/functionality for engaging in an online eCommerce e-transactions. In another preferred, embodiment, it is during the installation process that the user can be asked to select from a list of eCommerce capable applications that can be associated with the FFT consumer-side application. This will add a significant value to any consumer application that can be installed from third party web sites, like Microsoft.com, Apple.com, WinAmp, eBay.com, Amazon.com or any other websites that can introduce consumer side applications that enable consumers with the ability to execute online e-transactions directly from their desktop without specifically browsing a website (e.g. iTunes allows purchasing via the iTunes interface rather than requiring a separate browser to be used). The added feature of security and fraud prevention will increase customer, manufacturer, and seller confidence in using these types of applications and should increase expected revenues while reducing expected and unexpected losses. In addition to the above mentioned installation options, the FFT consumer-side application can also be installed as an add on module into the consumer existing antivirus/firewall, and general internet security application like MacAfee, Norton Interact Security, Panda and the like. In this embodiment anti-virus software is configured to both perform anti-virus detection activities and also to participate in FFT transactions and function as the client-side application. This will enhance the existing security application and bring added value as a real-time user authentication and transaction verification technology. These applications are usually pre-installed on user machines and are available for operation at all times when the computer is on and online, providing an optimal environment for the FFT consumer-side application. The eFFT application can be installed as an add-on module, as a feature on the program's menu, or as an add-on toolbar during a version-update operation.

The FFT installation process can generate and associate a unique Consumer-Side Application ID 210 that will be linked to the FFT Consumer-side application (this number can also be generated as a function of the consumer's computer ID, the processor ID, the TPN ID, and/or can be generated by the remote FFT-server and stored on the consumer's computer), or any eCommerce capable application that the consumer selected during the installation process. If the consumer installs the FFT consumer-side application for the first time, a password prompt or other authentication method will be displayed requiring the consumer to enter a traditional or conceptual password or other authentication method or provide a authentication token that will be associated with the unique ID associated with the consumer. The unique application ID, in addition to the unique device ID will be referenced by a FFT Seller-Side Server during subsequent online transactions involving the FFT Consumer-Side Application for every consumer who is a FFT participant. In one preferred embodiment, a consumer who owns several computers and hence has several FFT consumer-side applications can configure all FFT consumer-side applications to prompt for the password or other authentication methods and tokens associated with the consumer. This can occur during every instance when the levels of fraud protection settings are adjusted, or when the FFT consumer-side application control panel is accessed. This method will prevent unauthorized users and or fraudsters from accessing the FFT consumer-side application with malicious intent to perform online fraud, or to change a FFT participant's preferences so that such fraud can occur. Additionally, consumers who prefer to utilize the LOW or MEDIUM fraud protection levels, which will be discussed, are still protected.

In another embodiment, a consumer accessing the FFT central web site, will be required to login into the FFT consumer side applications configuration area and use the same unique password or other authentication method token, in order to access and modify all of the functionalities provided by the FFT consumer-side application from the FFT central website, hi this example, all changes to each consumer FFT consumer-side application will be communicated to the respective FFT consumer-side application. The Selection of a fraud protection level 209, can lead to installation or modification of features and components which can be accompanied by display of an installation progress bar. Further, out-of-band verification such as confirmation using a cell-phone or landline into which a code must be entered or spoken, or manual processed verification may be required for FFT client's who wish to alter their FFT security features.

Additionally, the installation wizard 206 can enable the installation and setting of preferences of the fraud deterrent consumer-side application to be initiated by a consumer using a method in which the consumer accesses the consumer's current credit card issuing bank. In other words, the consumer is forwarded to an electronic storefront for a bank such as HSBC, Bank of America, Chase, Wells Fargo or other bank that is sponsoring the fraud free transaction technology. The bank can, in turn, provide the consumer with the capability to download and install the consumer-side application. Alternatively, the installation of the fraud deterrent consumer-side application can be initiated by a consumer who is forwarded to a card association like VISA, MasterCard, American Express, Discover and others that are sponsoring the fraud free transaction technology and who provide the capability of downloading and installing the consumer-side application configured for their members.

When the installation is complete 212, a script will be called on the consumer's computer which will execute FFT Consumer-Side Application on the consumer's computer 214. The consumer is then returned to the webpage of the transaction so that the transaction can be completed 216. In the case where the consumer declines the use or installation of the FFT-application, the consumer can be returned to the transaction page to complete the transaction 218. In some cases declining participation in the FFT process wilt require a more stringent transaction process to be implemented such as requiring interaction with a customer service representative as part of the checkout process 220. In the case that a consumer who is a FFT user gets a new credit card and uses the same computer, the consumer can then register and associate the new credit card with the FFT consumer-side application. It is also possible for a FFT user to disassociate a credit card that is not used, or which has been lost or physically stolen, from one or all of the FFT consumer side applications with which the consumer is associated.

In one implementation of the FFT, in all cases where a new credit card is associated with an FFT consumer-side application, all registration/association, disassociation events of new or old credit cards are immediately broadcasted (or scheduled for broadcast) to all the other FFT-consumer applications associated with the specific consumer's profile (and also to a consumer's cell-phone or e-mail if this is indicated in their profile's preferences, or otherwise). In the case a fraudster obtains credit card information of a FFT user and tries to install a FFT consumer-side application, the installation process, and any other events will be communicated immediately (broadcasted) to all other FFT consumer-side applications associated with the consumer. In one preferred embodiment, any installation of a FFT consumer-side application that is considered a later installation from the first one ever performed by the consumer can be conditioned by the password or other authentication method token in order to commence the installation successfully. Additionally, if the password is compromised the installation process will be broadcasted and communicated immediately to all other FFT consumer-side applications associated with the consumer.

The FFT can be strengthened by agreements between computer manufacturers and FFT institutions such as credit card institutions. For example, Dell Corporation can work with VISA, in order to provide FFT on new computers and to make the FFT setup part of the process that occurs when the computer/device is purchased. In the case that FFT user purchases a new computer, the computer manufacturer can provide the computer with the FFT consumer-side application pre-installed in the factory, and associated with the user (and/or the user's credit card) as part of the prep-assembly-shipping process. In this embodiment, the consumer identity can already be verified, hence communication with all other FFT consumer-side applications is instantly available. The history of previous transactions, purchases, pending billing dates, pending verification dates, can be updated (almost) instantly the minute the consumer first accesses the internet and activates the FFT application. This type of initial setup may also require a consumer to pick up their computer at a store and show proof of identity such as driver's license having the shipping address that will be associated with the FFT program.

Figure 2B:
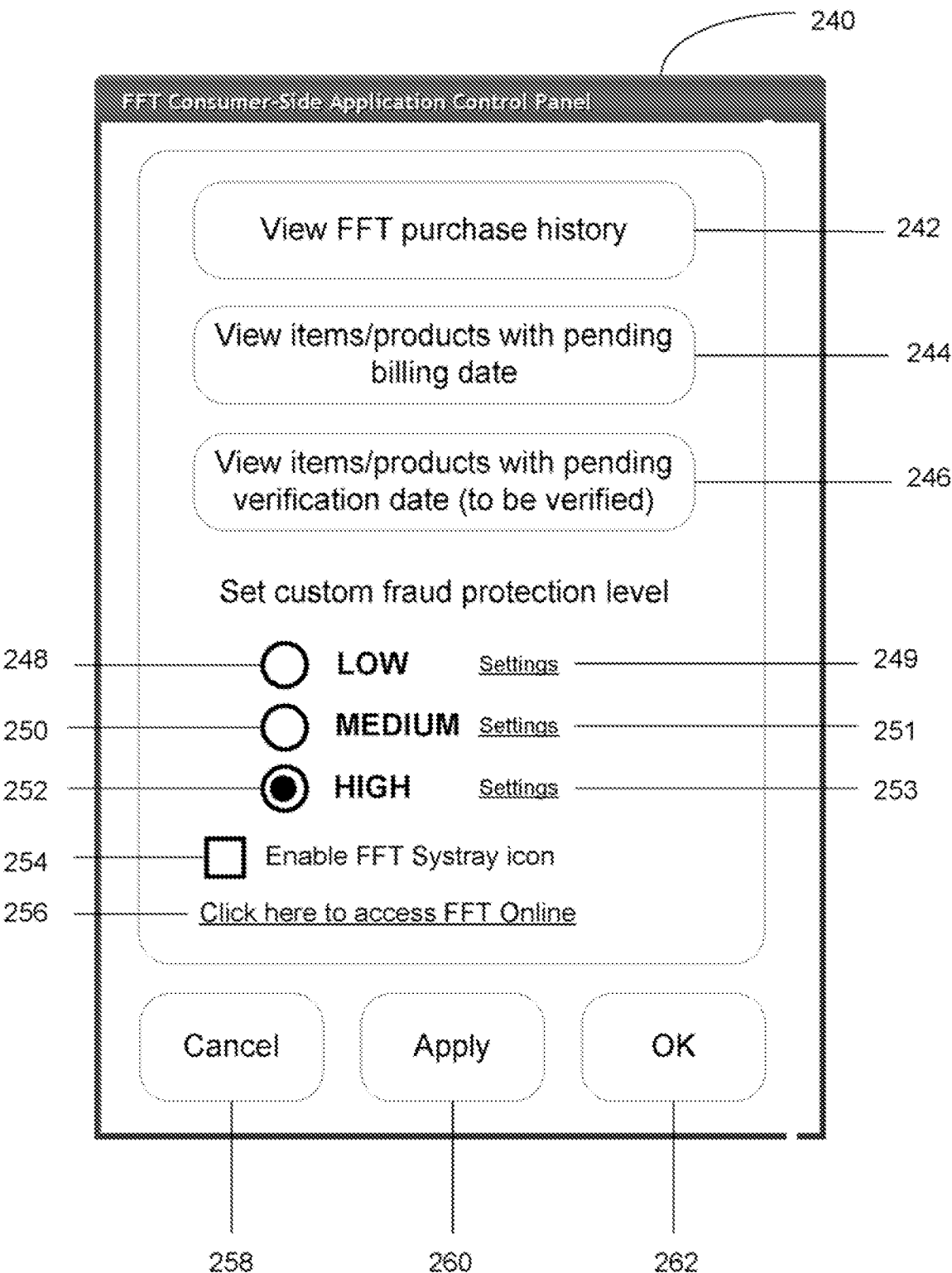
FIG. 2b is an exemplary diagram of a client-side Fraud Free Transaction application interface which enables a consumer to perform operations such as access past and current e-transaction data and set the level of fraud protection desired by a consumer.

FIG. 2b is a diagram of an exemplary embodiment of an FFT Consumer-Side Application control panel 240. The FFT Consumer-Side Application Control Panel can be invoked by selecting an associated menu-item from the client-side application menu or from a menu program accessed in the Operating System, or by invoking it from the FFT system tray icon information interface which is discussed in detail in FIG. 2d. In the FFT Consumer-Side Application Control Panel 240 there are several controls which the consumer can select such as, (1) View FFT purchase history 242, (2) View items/products with pending billing date 244, (3) View items/products with pending verification date 246. The viewing of all of the mentioned types of data can be accomplished locally on the Consumer's computer although the information may be stored remotely. This information can be accessed from, or displayed by, the FFT Seller-Side Server which transmits this information over the World Wide Web. In either case, the information can be encrypted and can be decrypted, by the Client-side FFT application, using various encryption/decryption schemes. In addition to the data access controls just described, users of the FFT can customize several fraud protection level settings. Clicking on the 'settings' feature 249 of the 'LOW' FFT option 248 will provide the user additional settings related to the LOW 248 level of fraud protection. Similarly this can be done for the 'MEDIUM' FFT option 250 and 'HIGH' FFT option 252 (251, and 253 respectively). Rather than these three fraud levels, more levels can be offered and additionally specific features rather than levels may be offered. There shall exist an additional control that enables the FFT System tray icon 254 setting. This tray control 254 will execute the FFT system tray application which can be password protected and which will provide the consumer with access to all FFT related data, functions, and features from the convenience of the desktop. In one embodiment, an information balloon can appear in response to consumer initiating (e.g. "roll-over actions"), in response to a particular date occurring, or in response to a command sent from an FFT Seller-Side Server, and can display every FFT event that needs the attention of the user. For example, items that may cause the appearance of the 'information balloon' include billing date arrival, verification date arrival, licensing issues and purchases/e-transactions that were recently executed online. When a consumer selects the Cancel option 258, all recent changes to the FFT Consumer-Side Control Panel Application will be discarded and FFT Consumer Application Control Panel will be closed. When a consumer selects the Apply option 260, all changes to the FFT Consumer-Side Control Panel Applications will be applied immediately and FFT Consumer-Side Application Control Panel will stay open. When a consumer selects the OK option 262, all changes to the FFT Consumer-Side Application's Control Panel will be applied immediately and FFT Consumer-Side Application's Control Panel will be closed.

Figure 2C:
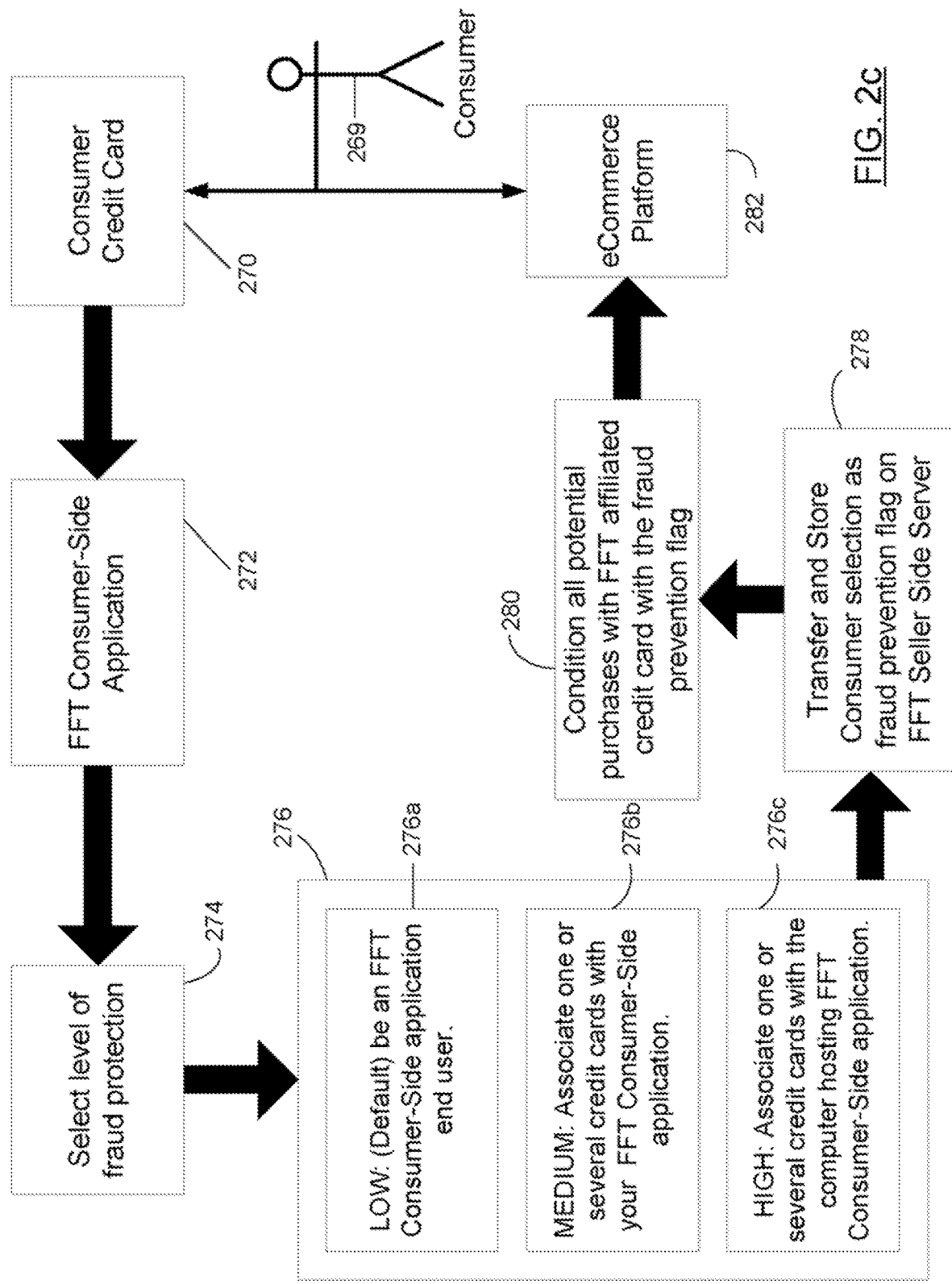
FIG. 2c is a flow diagram of an exemplary method of accomplishing the selection of a Fraud Protection level in the context of an eCommerce e-transaction.

FIG. 2c shows schematic flow chart that depicts an exemplary process of a consumer participating in an FIT transaction. The consumer 269 and credit card issuer 270 intend to cooperate to achieve an online e-transaction. The FFT Consumer-Side application is accessed 272 by the consumer on a local device. The consumer is provided with an FFT Consumer-Side Application Control Panel interface by which a level of fraud protection is selected 274. The FFT method can provide the user with an option to select from a plurality (e.g. three) of levels of fraud protection 276. In this example, the first level (which may be set as the default level) of fraud protection is LOW which may simply allow the application to indicate to querying entities that the consumer is an FFT Consumer-Side application user 276a, and therefore FFT information should be used and transmitted during the transaction between the FFT remote Server (e.g. seller-side server) and the FFT Consumer-Side Application. The second level is MEDIUM and this level may associate at least one credit card with the consumer's FFT Consumer-Side application so that the credit card can only perform an online e-transaction if it is used on a computer with a FFT Consumer-Side application which has an associated FFT unique identifier. This level is of value to consumers who usually do need to perform online e-transactions from different computers; hence these consumers can have several FFT Consumer-Side applications associated with several computers. In one example of this MEDIUM level, an e-transaction cannot be performed unless a FFT Consumer-Side application is installed on the host computer. The seller in this case can detect in the Transactions/Consumers Depository DB the same consumer and several repeated transactions from several FFT Consumer-Side Applications. If the consumer decides to change the level of fraud protection on one of the computers used to HIGH, then the FFT Seller-Side server will, in this example, disable all other FFT Consumer-Side Application unique identifiers and no transactions will be allowed from these computers. The computer with the FFT Consumer-Side Application set to HIGH will become the only computer that has access to change the fraud level at this point. The remainder of the FFT Consumer-Side Applications and their respective host computers are considered, at least for this period, to be 'ghosts'. An additional method to change the fraud level for one of the FFT Consumer-Side Applications is by accessing the FFT Seller-Side (or card issuing bank) Server directly which will provide the consumer with an interface to see all of their associated FFT Consumer-Side Applications. Changing one of these applications fraud levels to HIGH from the FFT Seller-Side Server interface will change the status of the rest of the FFT Consumer-Side Applications and their respective host computers to 'ghosts', hence no e-transactions will be allowed from these computers.

The HIGH deterrent level can associate at least one credit card with a single computer on which the FFT Consumer-Side Application is installed 276c, or can utilize other restrictions which make fraud increasing difficult for illegitimate users. Similarly, the LOW and MEDIUM levels can utilize a multitude of deterrents, which may be user selectable and adjustable, but which in general become more restrictive as the level increases. It is contemplated that seller's may also require that, selected features or a minimum fraud level be used during a transaction.

This fraud deterrent paradigm is an advantage to consumers since it can reduce the risk of an online e-transaction from being performed without their knowledge or permission. It serves to empower the online commerce community who can now control levels of fraud protection which are implemented including allowing such measures as allowing only specific computers/devices for use during online e-transactions, and can associate devices with specific credit-cards. The FFT Consumer-Side application will normally store and also transfer the consumer's selection as fraud related parameter value (e.g. a fraud flag value) to the FFT Seller-Side Sewer 278. This feature is advantageous since it provides the merchant and the credit card issuers with a 'high level' flag that can be used to control whether a transaction is allowed to transpire on their eCommerce site prior to the time when it might be submitted for authorization. This type of regulation of activity can significantly reduce the risk of a fraudulent activity from occurring. The FFT feature also decreases the risk that a transaction will ultimately be charged back, by making this type of charge back more difficult to substantiate. This being mentioned, merchants who are participant in the FFT method can now conditionally perform all potential purchases that have an FFT affiliated credit-card with the fraud prevention flag 280. The same consumer who has the FFT Consumer-Side application can now access any eCommerce platform 282 that hosts the FFT Seller-Side Server and conduct online e-transactions relatively more securely.

FIG. 2d is a diagram of an exemplary FFT Consumer-Side application system tray information display 290 where information on some or all of the e-transactions (e.g. purchases) that have been made through a merchant who uses the FFT service method can be displayed. The information displayed can be, but is not limited to, the item purchased, the website it was purchased from, the merchant name as it appears on the financial statement, the purchase date, the amount of the transaction, version numbers, licensing terms and conditions, billing date 292*a*, verification date 292*d*, Extended Download Service links 292*c*, and last four digits of the credit card used in the e-transaction. Additional fields for shipping tracking numbers, or other messages which can be provided by the seller at times after the transaction are also possible. The billing date 292 or the verification date 294 as well as other types of information can be hyperlinked to information or, for example, linked so as to provide access to the FFT Seller-Side Server entry that is related to the e-transaction for that item. A consumer can select this link in order to view/change the billing date. The verification date field 294 can serve as a link to the FFT Seller-Side Server where the consumer can verify the e-transaction. For example, the application balloon can pop up on the date when the verification is due, and the consumer can click on this field to be relayed to the FFT Seller-Side server where the consumer can then confirm or re-confirm that he is satisfied with the product. In one embodiment, failure to confirm on the part of the consumer, or if the consumer does not agree to verify the purchase can result in the FFT Consumer-Side application module de-installing, or deactivating, the relevant digital product or proposing such an action. Additionally, there can be additional links such as 'Connect to FFT' which facilitates the consumer establishing online access to the consumer's FFT account 296. Further, a link to launch the local FFT Control Panel application 298 can be provided. These linked fields are advantageous since these provide the consumer with easy and efficient access to historical online transactions as well as providing a central location which can keep track of all online transaction activity and where consumer's can easily reconcile their transactions with credit card statements.

The FFT consumer-side application can function as a software purchase and licensing manager (SPLM) to increase end-user satisfaction and provide advantages to the merchant's as well. With respect to the consumer, not only can the FFT consumer-side application provide features related to the verification and billing dates, but a number of other features as well. The FFT consumer-side application can include the features and modules now described and the modules can exist within the client-side application, the server side application, and/or within both applications in order to perform their intended functions. All of the intended functions mentioned herein can be accessed via the FFT Consumer-side application control panel 240 (of FIG. 2*b*), by the consumer accessing his or her personal profile on the FFT Central Web Site 149 (of FIG. 2*a*), and by accessing the local FFT consumer-side application system tray information display 290. The intended functions can include:

1. Storing, information related to such features as extended download service. For example, rather than requiring a user to find old e-mails related to how to use an extended download service which has been purchased, if the software must be downloaded again, the FFT can have a link which easily allows the client to do this. The FFT therefore contains an 'extended download service' module which provides this functionality and provides user friendly graphical interface for interacting with the consumer on operations related to this feature 292*c*.

2. Sending activation codes, licenses, serial numbers, related products and product updates to clients as these become available 292*d*. For example, the client may receive the download of a software product immediately, but may not obtain the activation code until payment is received. The activation code can be (semi)-automatically sent to the FFT client-side application and the consumer will be alerted to this with a balloon pop-up. The FFT therefore contains an 'activation codes, licenses, serial numbers, related products and product updates' module which provides this functionality and provides user friendly graphical interface for interacting with the consumer on operations related to this feature.

3. Sending related products based upon what the client has downloaded. For example, if the client has downloaded a number of songs by an artist, the FFT history database can be analyzed and based upon the past tastes (i.e. purchases) of the consumer; additional digital products may be suggested. Additionally, as new songs, albums, or other digital media is released, consumers may be notified, if they toggle this feature in their FFT preferences. Links may be included for allowing consumers to easily access Java-based presentations of software, or samples of music or other digital media being offered for purchase. The FFT therefore contains a 'targeted advertising and product offering' or 'strategic marketing' module 292*e* which provides this functionality and provides user friendly graphical interface for interacting with the consumer on operations related to this feature.

4. Notifying the consumer of deals relating to product updates which are being offered for purchased products, if they toggle this feature in their FFT preferences. The FFT therefore contains a 'product update and manufacture rebate/sale' module 292*f* which provides this functionality and provides user friendly graphical interface for interacting with the con sinner on operations related to this feature.

5. Warning the consumer of upcoming license expiration, and or recurring billing subscription reminders with option to opt out. This provides a rapid manner of license renewal in which consumers can easily provide credit card information, either manually or from a credit card number in the FFT database. This last feature is valuable to companies which perform online distribution of media since when a product expires; the client may go directly to the manufacturer to renew the license rather than doing this from the online distributor. Currently, after the original purchase of the software, the distributor normally doesn't make any additional revenue related to license renewals. The FFT therefore contains a 'licensing renewal' module 292*g* which provides this functionality and provides user friendly graphical interface for interacting with the consumer on operations related to this feature.

The SPLM can be realized as a specialized embodiment of the FFT, and implemented with features primarily incorporated within the client side or server-side application, and can utilize similar security features in order to increase user security and satisfaction while deterring fraud.

An added benefit of using the FFT program is that a consumer can be identified to a FFT-seller in less than a transient manner. Normally, communication occurs fairly easily between a consumer and seller during a transaction, but is more difficult afterwards. The seller may contact the consumer by phone or e-mail if there are issues after the transaction occurs. However, the user may not answer their phone or an e-mail spam-guard program may send the seller's e-mail to the trash. An added benefit of the FFT program is that seller's and consumers may send, each other messages after a purchase is made using the FFT program. For example, a seller may have a question for the consumer if an incorrect amount for a charge was input by a consumer. The seller can send the message to the FFT-server. This message can then be forwarded to the FFT-client, side application next time communication is established between the client-side application and a remote FFT-server, which may be the consumer's bank. This may be especially useful for information related to changes in flight times, arrival times or tracking numbers, of products which where shipped, and the like.

Figure 3:
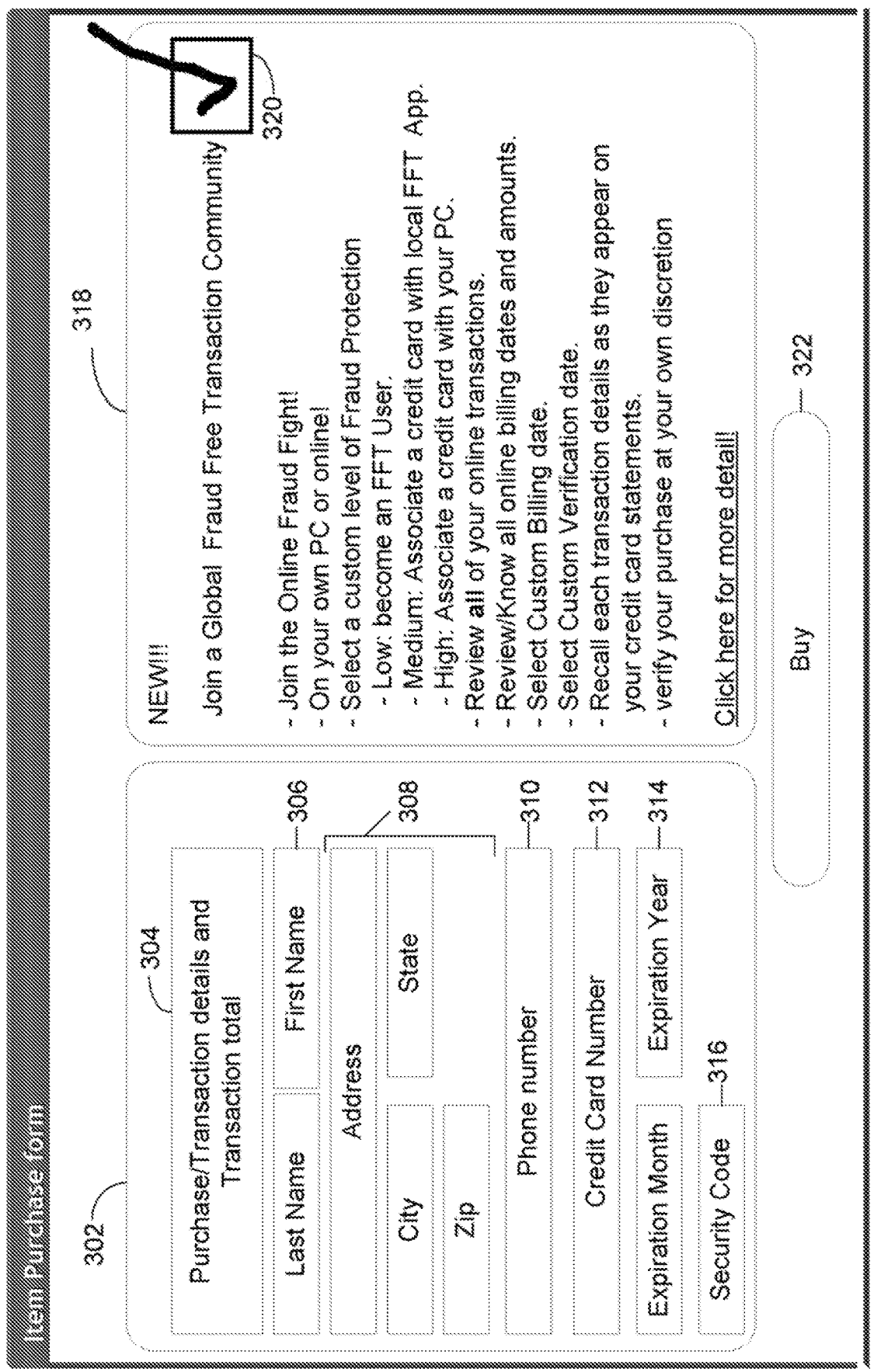
FIG. 3 is an exemplary interlace provided on an eCommerce web platform and the Fraud Free Transaction dynamic control indicating the willingness of a consumer to participate in a Fraud Free Transaction.

FIG. 3 shows a purchase oriented web form 300 which enables the purchase of an item. The form 300 allows the e-Commerce platform to gather consumer information needed to perform an eCommerce transaction involving a purchase of an item over the internet. The left side of the form 302 provides fields for data traditionally entered for e-commerce transactions. The purchase/transaction details and transaction total amount due 304 are displayed. There are fields for the consumer to provide last and first names 306, followed by the consumer's billing (and possibly shipping) address information 308. An additional item is a phone number 310 followed by credit card number 312 and the expiration month and date for the credit card 314. A security code can also be required to verify the credit card 316, such as VBV, CVV2, CVC, and 3DSecure security codes that are required by the major credit card associations such as VISA, Master Card, American Express, and Discover. When the FFT Seller-Side Server is available for the eCommerce platform owner, the option to join a Fraud Free Transaction community 318 will be presented to the user on the screen. This feature will be enabled on the commerce platform by adding a predefined script module that will display the FFT dynamic control 320 to consumers. If the web-form 300 is configured to identify existing FFT participants then this option will only be shown to clients who are not already members of the Fraud Free Transaction Community (e.g. have the FFT already installed on their computer). If clients are existing participants, they may be presented with a different screen related to, or presented by, the FFT Consumer-Side application. This can be, but is not limited to, strategic marketing and advertising that is targeting the consumer based on previous historical purchases with the specific merchant and with other merchants as in some embodiments. The information on all past e-transactions will be communicated to the FFT Seller-Side Server. Alternatively, in order to increase the privacy of the FFT-participant, simply the number of past e-transactions, the merchants involved, the transaction amounts, and the verification/chargeback status of the transaction, may be made available to FFT-seller-side servers, rather than information about the actual items purchased.

The type of information that is sent to a seller's FFT server may be adjustable and selectable by the consumer, by editing the preferences of the consumer-side FFT application. Additionally, FFT-sellers may be ranked from 1-5, where a score of 1 is assigned to banks, and larger merchants (e.g. Amazon.com; Wal-Mart; Sears) while 5 is assigned to small merchants with little historical activity and who are not well known in the FFT-network. The type of information and level of detail provided to the seller may be based upon their score. This differential display can be enabled by a discovery and detection algorithm that will attempt communication with a FFT Consumer-Side Application that, may potentially reside on the consumer's computer (which will be described in FIG. 4). Therefore, this panel 318 will only be displayed if the user is not an FFT member by running a FFT Consumer discovery and detection routine in the background which tries to communicate with the consumer computer. After all required information is entered, the consumer is permitted to finalize the transaction and purchase 322 the product.

Figure 4:
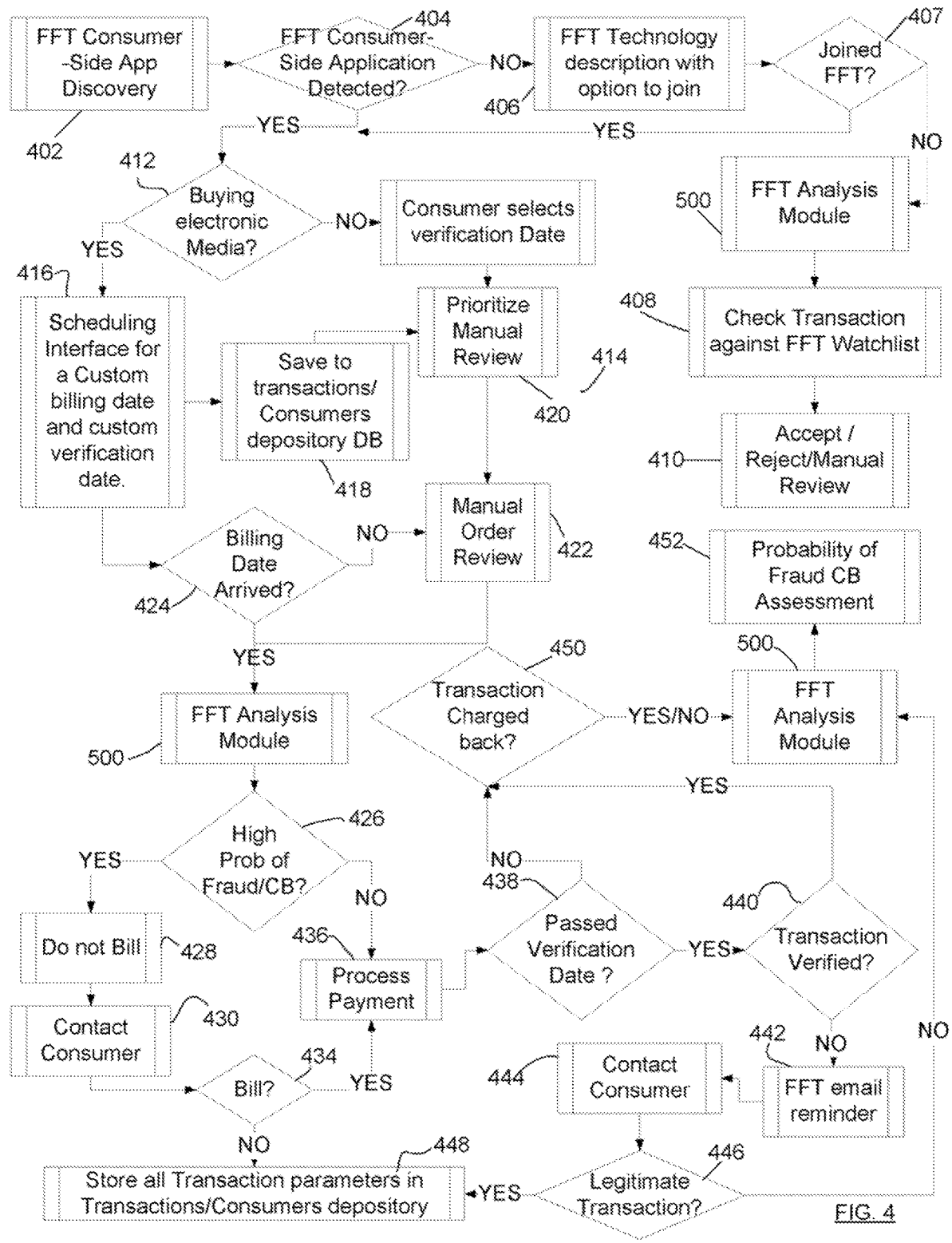
FIG. 4 is a flow chart of an exemplary process that is realized within an eCommerce environment that utilizes a Fraud-Free Transaction Seller-Side Server Service.

FIG. 4 is a diagrammatic flow diagram which depicts an e-transaction process flow within an eCommerce platform that hosts a Fraud Free Transaction (FFT) system 100 (of FIG. 1). The diagram represents the progression of a consumer's transaction wherein the consumer accesses an eCommerce platform item purchase form 300 (of FIG. 3). The first step in the transaction progression is a FFT Consumer-Side application discovery/detection 402 performed by the FFT Seller-Side Server via the FFT Seller-Side Communication Module 112 (of FIG. 1) which searches for FFT components which have been operated or installed within the consumer computer. If the FFT Consumer-Side Application is not detected 404 then a FFT technology description will be displayed to the consumer with an option to join by installing the FFT Consumer-Side application 406. Alternatively, the FFT Seller-Side Server may also ask the consumer if they have an existing FFT account and may operate to verify user identity and further, if requested by the consumer, to re-install a FFT Consumer-Side application on the computer they are currently using to perform the e-transaction.

The next phase in the progression of the e-transaction is determined conditionally upon whether the user agrees to utilize the FFT 407 hence installing the FFT Consumer-Side Application according to the steps of (of FIG. 2*a*). If the Consumer declines to permit the FFT, and does not install the FFT Consumer-Side application on the consumer computer 136 (of FIG. 1), then all of the parameters associated with the transaction (the 'transaction profile') are passed to the FFT analysis module 500. The FFT Seller-Side Server Application Module 118 (of FIG. 1) then checks all transaction parameters against the FFT watch list 408 that resides on the FFT Real time DB 116 (of FIG. 1) and is a subset of the Transactions/Consumers Depository DB 120 (of FIG. 1) which holds all transactions and consumers performed by consumers who are not FFT participants. The final weight/score returned for the transaction will determine if the transaction should be automatically accepted, automatically rejected, or pushed into manual review 410. If the FFT Consumer-Side Application has been detected on the consumer computer 404, which may occur with the assistance of the consumer, or if the Consumer has agreed to allow the FFT method and has installed the FFT Consumer-Side application 407 then step 412 occurs wherein if the consumer buying Electronic media is presented with a scheduling interface for allowing the user to select at least one of a custom billing date and a custom verification date 416. Both Custom billing date and custom verification date are saved into the Transactions/Consumers Depository DB 418. The custom billing date selection can be used to prioritize the manual review 420 process of that transaction in the case where the transaction is routed to a manual review process; manual order review 422 will follow for the transactions that indicate a need for the latter to substantiate fraudulent or legitimate transaction by a human operator. The FFT Seller-Side Server sorts all transactions based on their billing dates and communicates with eCommerce payment module the scheduling of authorization requests for payments for each transaction. The value of providing custom billing date is evident in the ability for a merchant to analyze transaction to a higher degree of confidence and verify a legitimate transaction or a fraudulent one. This process will reduce fraud on the seller eCommerce platform in addition to occurrence of chargeback's that result from fraudulent orders being placed.

The time lag selected by the consumer between the date of the transaction and the selected billing date can indicate if the transaction is likely to be fraudulent or result in a charge back. In the case where a potential fraudster selects a billing date that is on the same day as the transaction date (i.e., billing is instant) the merchant will immediately inform the credit card owner via the communication protocol that is established between the FFT seller-side server and the FFT consumer-side application of the transaction. The credit card owner can then approve or reject the transaction authorization request. Even in the case where the consumer did not add the specific merchant to their list of FFT merchants, this communication will still occur instantly since the credit card issuing bank receives a real time authorization request from the merchant which takes place while the consumer can be presented with a progress bar on their browser indicating that the transaction is being processed. When the issuing bank receives this authorization request it will identify the device and consumer application associated with the credit card on the issuing bank server, and initiate the user authentication and transaction verification process. The user can then either approve or decline the transaction. This method presents a robust and redundant strategy for preventing online fraud.

If the fraudster has the consumer's computer in addition to the credit card information, the password prompt or other authentication method token will be required to approve the transaction. The FFT seller-side server can be configured to push the transaction into manual review if the response from the FFT consumer-side application is timed out. This provides consumers with highest level of security in addition to reducing chargeback costs for the merchant.

The value of providing custom verification date provides an additional tool to the merchant that can be used to determine the level of confidence for the specific consumer performing the transaction. This means that if a consumer buys several products from the merchant and always verifies the transaction post-purchase, over time this consumer can be considered a trustworthy consumer and transactions from this consumer can increasingly be automatically accepted. This will provide monetary value to the seller by resulting in reduced costs of manual review and over time serves to reduce the number of hours of human review of orders. Additionally the FFT Seller-Side Server communicates with the FFT Seller-Side application for providing information, updating or reminding on upcoming verification, dates. If the Billing date has arrived 424, all transaction parameters are pushed for a second iteration into the FFT Analysis Module 500 (of FIG. 5) that is configured to calculate scores related to the probability of Fraud and/or Charge back types of activity. In the case of low probability of fraud or chargeback, the e-Commerce platform will process the payment 436 using a low-fraud process which is not overly restrictive or cumbersome for the consumer. If a 'High Probability' risk-level of Fraud 426 is detected, then the FFT Seller-Side server Application Module 118 (of FIG. 1a) can flag related parameters of the eCommerce platform payment module so that no charge is debited 428 to the consumer credit card. The E-Commerce Platform, business owner or seller can then be alerted to contact the consumer 430 using various communication methods and manually decide whether to process the payment and charge the consumer 434.

If the seller's decision is to not bill the consumer, then all transaction parameters and key indicators are stored in the Transactions/Consumers depository DB 448. Alternatively, if a decision is made to bill the consumer, then the e-Commerce platform will process the payment 436, and the storage of all transaction parameters may occur as well. Additionally, the FFT Seller-Side-Server Application Module 118 (of FIG. 1a) is configured to monitor whether the transaction's verification date has occurred 438. If the Verification date has occurred, followed by the transaction being verified 440, then further steps are implemented in order to determine if this verification was successful. A related step assesses if the transaction resulted in a charge-back 448, and if this is the case then all transaction parameters are pushed into the FFT Analysis Module 500 for a probability of Fraud/Charge back Assessment 452. This assessment is performed specifically in relation to the transaction parameters and serves to update the FFT Real Time DB 116 (of FIG. 1a) with new weights/scores for all transaction parameters. This will deter fraud related to this consumer or credit card in the future.

If the transaction was not charged back 450, then all transaction parameters are pushed into the FFT Analysis Module 500 for a probability of fraud/Charge back Assessment 452 that, is performed specifically for the Transactions/Consumers depository DB. In this case the consumer and associated parameters are updated, increasing the level of trustworthiness associated with the consumer. Future orders from this consumer are then processed using less stringent scrutiny in the context of the FFT system. If the transaction passed the verification date 438 and was not verified 440, then the FFT Seller-Side Server will perfume a number of related functions. For example, it can send an e-mail reminder 442 to the consumer, and further seller-side customer service personnel can contact the consumer 444 using communication methods such as using a phone. If the transaction is legitimate 446, then all transaction parameters are also pushed to the Transactions/Consumers depository DB 448 where they are stored. If the transaction is not valid, all transaction parameters are pushed into the FFT Analysis Module 500 for a probability of fraud/Charge back Assessment 452 that is performed specifically in relation to the transaction parameters. The FFT Real Time DB 116 (of FIG. 1a) is then updated with new weights/scores for all transaction parameters.

Figure 5:
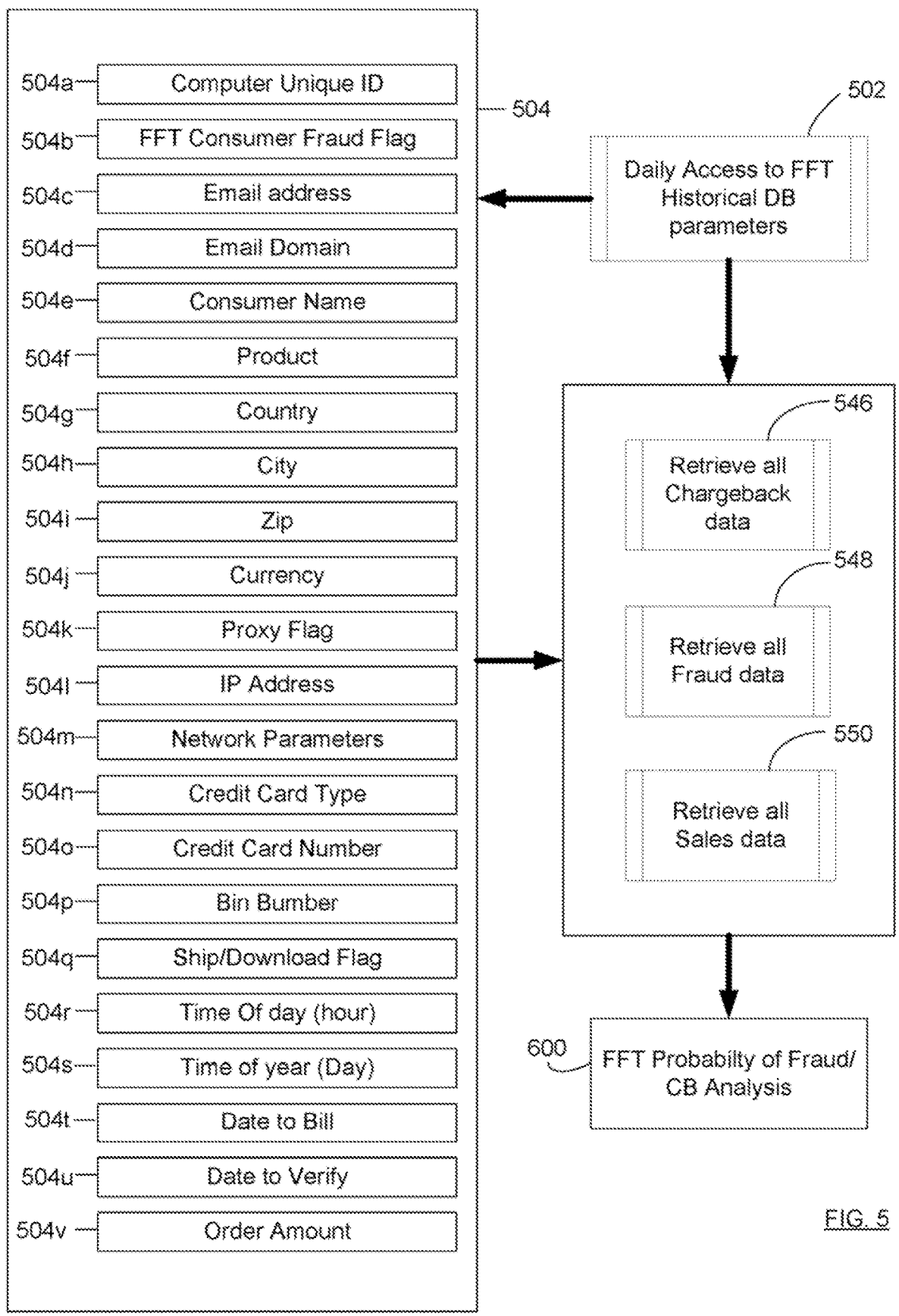
FIG. 5 is a flow chart of an exemplary process for data retrieval of parameters from a multitude of the Fraud Free Transaction Server databases for providing a risk probability value of fraud and charge-back, and relevant parameter values related to a fraud-related analysis.

FIG. 5 is diagrammatic illustration of a system having information which is related to depicting the daily access to an FFT Historical database of the Transactions/Consumers depository DB 120 (of FIG. 1a) parameters 502 and the retrieval of all charge-back data 546, all fraud data 548, and all sales data 550 for each parameter. The possible parameters can be but are not limited to Computer Unique ID 504a, FFT Consumer-Side application fraud level flag 504b, Email address 504c, Email Domain 504d Consumer Name 504e, Product 504f, Country 504g, City 504h, Zip 504i, Currency 504j, Proxy flag 504k, IP address 504l, Network parameters 504m, Credit Card type 504n, Credit card number 504o, Bin number 504p, Ship/download flag 504q, Time of Day (hour) 504r, Time of year (day) 504s, Date to Bill 504t, Date to verily 504u, and Order amount 504v. Post-transaction retrieval of all historical data, all data is pushed into FFT Probability of Fraud/CB Analysis module 600.

Figure 6:
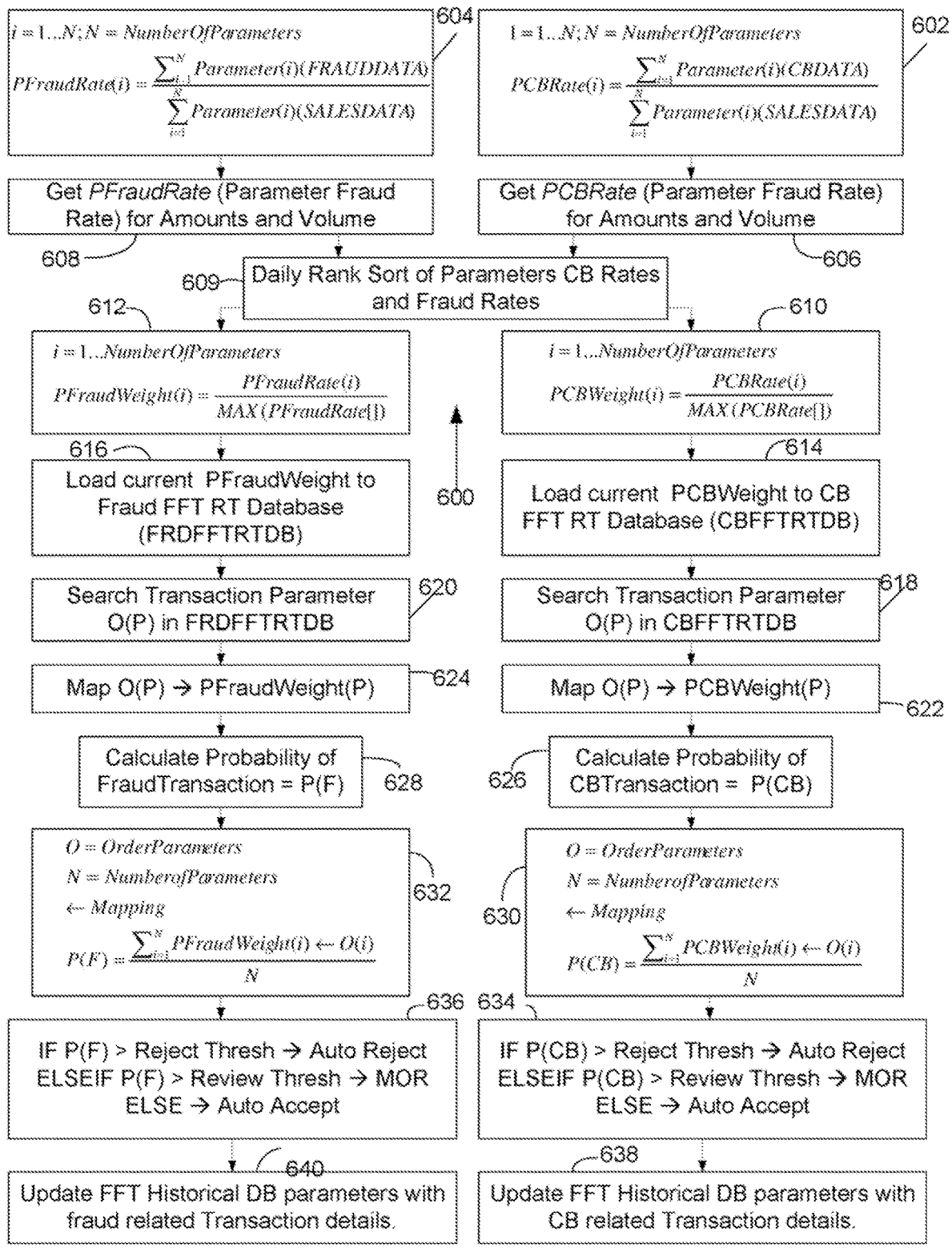
FIG. 6 is a flow chart of an exemplary process which is accomplished within a Fraud Free Transaction Server and which provides measures related to the risk of fraud and/or charge back analysis for every e-transaction which occurs on an e-commerce platform.

FIG. 6 is diagrammatic chart depicting and FFT method for calculating probability of Fraud and providing chargeback probability risk analysis 600. For every transaction parameter the module first retrieves the probability of fraud rate PFraudRate (i): 604, and the probability of Charge back rate PCBRate (i): 602, from the FFT Real Time DB 116 for amounts, and for volume 606, 608. The FFT Probability of Fraud/CB Analysis module 609 then sorts and ranks (on a daily basis) all parameters for CB Rates, and Fraud Rates 609. The Post dally sort, module calculates the Fraud Weight for each parameter (a) (PFraudWeight) and charge back weight for each parameter (b) (PCBWeight) by utilizing the formula 612 and 610, for fraud and charge back, respectively.

The final weights for each parameter are then uploaded into the FFT Real Time database sections for fraud and charge backs (DB #2) 616, (DB #1) 614, respectively (remove long label from FIG). When a transaction parameter enters the FFT Probability of Fraud/CB Analysis 600, each transaction parameters searches the Fraud and CB real time DB for that parameter value 620, 618 If the transaction is found in the DB #1 614 or the DB #2 616, then the transaction parameter is mapped to the value of that parameters fraud weight (PFraudWeight) or charge back weight (PCBWeight) 624, 622. If the parameter is not found in one or both databases 614, 616, the transaction parameter is mapped to a zero value. The FFT Probability of Fraud/CB Analysis Module then calculates the Probability of Fraud transaction P(F) 628, and the probability of Charged back transaction P(CB) 626 by utilizing the following formulas defined in steps 632 and 630.

If P (F) is greater then a preset fraud rejection threshold, FFT will auto reject the transaction. Else if P (F) is greater then some fraud review threshold and smaller then the fraud rejection threshold, transaction will be sent to Manual order review for Fraud assessment 636. If P (CB) is greater then a preset charge back rejection threshold, FFT will auto reject the transaction. Else if P (CB) is greater then some charge back review threshold and smaller then the rejection threshold, transaction will be sent to Manual order review for charge back assessment 634. Based on analysis and/or review results, FFT Historical DB parameters will be updated with new fraud data from transaction details 640 and or charge back data from transaction details 638.

Validating Client's and Linking E-Identities to Cards

The material in this section will use the term e-FFT rather than FFT as has been done for the prior portion of this application. The term e-FFT is used to designate a system which is more focused upon incorporating e-identities of $3^{rd}$ party services in the transaction validation process. Although the client-side FFT program is a form of e-identity, the e-identities described in the following sections are largely realized using identities tied to third party services such as presence and instant-messaging (IM) services, VOIP services, and e-community identities. There are two steps which must occur for the e-FFT to be realized: Step 1—a valid client associates an e-identity with a credit/debit card; and, Step 2—the client uses the e-FFT payment verification technology during the transaction.

Step 1: Client Validation and Association of an E-Identity with Credit Card.

This step (and its related methods and systems) may occur in a number of manners depending upon how the linkage is created and the type of e-identity which is used. Several preferred embodiment for validating the identity of the client as well as the client's right to link a card with an e-identity are as follows:

a. a credit association itself provides the 'associate e-identity contact information to activate online verification' using a set of web-pages designed for this purpose. Clients can provide information such as a home telephone number, the amount owing on their last credit-card bill, and the like as is well known. This is similar to what is done with Verified-by-VISA, except the eFFT results in the e-identity linkage;

b. In another embodiment, a bank (card-issuer) allows clients to 'associate e-identity contact information to activate online verification' while the client is logged onto their online banking. Further, debit cards and bank accounts can similarly be linked using this method;

c. In another embodiment, the client validates their identity and links their e-identity directly with the e-FFT service on a one time basis by filling out the necessary contact information and personal information that is similar to what occurs when using 'Verified by Visa' or PayPal;

d. In another embodiment, similar to PayPal, and other payment service providers, the client may have to provide information that only a user would know and which the service can also verify due to its participation in creating that information. For example, a credit of $0.17 may be made to the client's credit card and the client must then enter this information as part of the verification service. This type of embodiment requires a one-time validation effort by the user, but has the benefit of being able to be realized without the participation of a credit-card association, or particular banks;

e. In another embodiment, an e-mail or other service provider (AOL, or the client's phone company or cable company) can assist in the validation of the clients identity and right to link the card with an e-identity. In this case one manner of allowing the credit card to be validated and linked with a client's e-identity is if this same card has been used for at least a selected amount time to pay for membership in the internet-based community and/or e-mail account (rather than a free account), has been used to pay for above a minimum cumulative amount over time without any problems, has been used to pay for at least a minimum amount a selected number of times, or has been used to create a payment history which meets selected criteria needed for validation and authentication. Rather than requiring the assistance of a bank or credit association, the service provider can assist the eFFT service in validating a client's identity and linking the card with a client's e-identity. This enables service providers, as well as banks, to perform operations which associate credit cards with client's e-identity; and, f. In another embodiment, the, eFFT can use 'Verified-by-VISA' or other pre-existing service in order to validate a client, prior to permitting the linkage of the card with an e-identity, even though this service is provided by Visa rather than eFFT, by requiring the client to make a payment and validate the payment using the Verified-by-VISA service. Since the client must have already gone through the steps of getting verified by visa, success of the transaction indicates a valid client. In this manner eFFT ensure at least equal validation efforts as those of validate by VISA.

The e-identity which is to be linked to one ore more credit-cards of the client can be implemented as one or more of the following:

a. an e-FFT client-side software module which resides on the client's computer (and which is identified by at least one of: a unique identification number; and, unique identification information related to a customer's authorized computer). In one method, the client downloads this program, for example, from an authorized website of their credit card association or from their bank's website;

b. an instant messenger identity (JABBER, AIM, ICQ, MSN and Yahoo) in which the messenger service is used to communicate information to the client when a transaction occurs, and which may request that the client accept or reject a transaction;

c. a VOIP/IM,SIP,EverythingOIP identities (Skype; Google-Talk);

d. an e-mail identity with selected service providers such as yahoo mail or hotmail; and, e. an internet-based community identity (i.e. America Online; Earthlink, e-Bay, PayPal, Facebook, or myspace member identity). The transaction validation can occur for example, using pop-up windows if the client is logged into one of these e-communities, or can be displayed on the client's homepage.

Step 2: Using E-FFT Payment Verification During Transaction.

Figure 7:
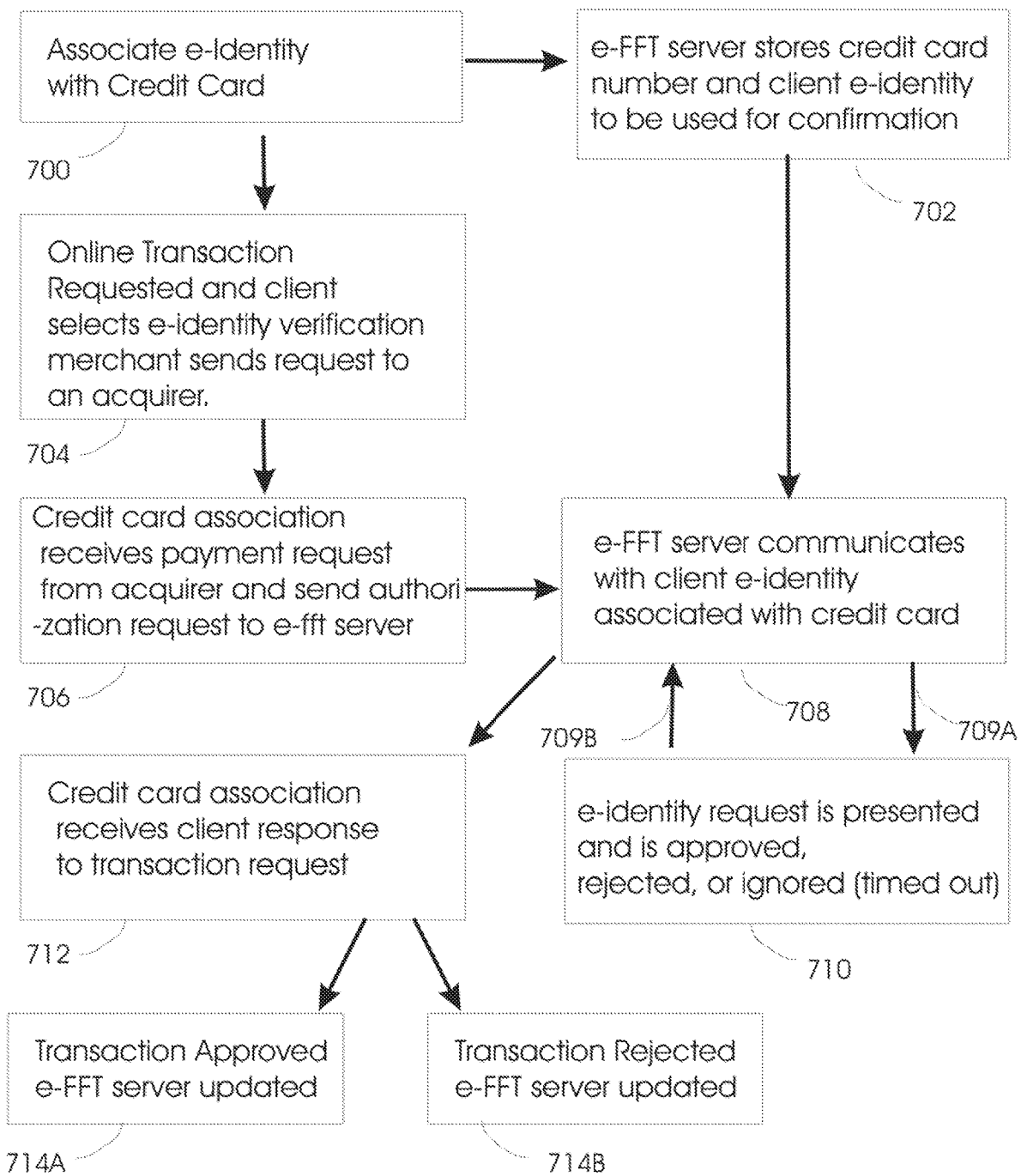
FIG. 7 is a flow chart of an exemplary process which is accomplished within a Fraud-Free Transaction Network which provides real-time transaction requests to e-identities associated with a client who either approves or rejects a transaction.

A first preferred embodiment of the method is shown in FIG. 7, wherein the first step 700 includes having the client associate an e-identity contact which used for validation with their credit card. As taught, this step may occur using an online account for the client's credit card (and which is provided by a bank with whom the user has an existing account a associated logon and password information or can be provided by the credit-card association) which has an option such as 'associate this e-identity with the credit card to activate online verification' followed by a field which allows the user to input the identification information for the e-identity (see FIG. 9A). This information is then stored on an e-FFT server 702. The e-FFT server may be hosted by the credit card association or bank, or is stored using a $3^{rd}$ party e-FFT service. Further, the e-FFT service can also be provided, at least in part, on servers which operate with different e-identity service providers (e.g. the information related, to an e-identity provided by MSN.com contains e-FFT information on a service hosted by, or only connected to, MSN.com). During an online transaction, the client is given the option to validate the transaction using e-identity verification, as well as using other verification services such as verified by VISA or whatnot. If, after purchasing goods on a merchant's website, the client makes a request for e-identity verification 704 then this is sent to the acquirer along with the other transaction information. The credit card association (or acquirer or issuer) receives payment request and sends authorization request to e-FFT server 706 which may be hosted internally or which may be part of a $3^{rd}$ party e-FFT service. The e-FFT server then communicates with client e-identity associated with credit card number and waits for a confirmation signal 708. It is worth noting that because the e-identity has been associated with the card being used, the eFFT server determines where to send the validation request based only on the card number being used, and this information is not provided by the client, to the merchant, at time of the transaction. The client is then presented with a request for approval of the transaction and this is either accepted or rejected 710 (or the client doesn't respond, within a specified interval and the request is 'timed out'). For example, the client may by presented with a pop-up window which requests an 'accept' or 'reject' client response to be provided. The client response is then returned to the eFFT server 709B which sends this to the credit card association (or issuer or acquirer) where it is received 712 so that the transaction can either be approved 714A or rejected 714B. Additionally, in step 708, the e-FFT server is updated so that the transaction history for the card, the e-identity, the product, and the merchant remains current. This enables fraud-detection engines which are active in the e-FFT system to monitor activity and perform anti-fraud analysis and to enact anti-fraud protocols including selected measures, alarms, and deterrents. Additionally, various additional anti-fraud monitoring and analysis can be used as is described in FIG. 6.

The manner in which the client verifies the purchase will vary as a function of the type of e-identity which is used as well as other factors how the e-identity has been associated with the card. In the case of e-mail verification, rather than a pop-up window type of verification, the client must log onto her e-mail account in order to verify the transaction. The client can then reply to an e-mail sent by the e-FFT, reply with the word "accept" or "reject", or perform some such other action (as may occur with HTML based emails), such as the e-mail may have an 'accept' and 'reject' box which is toggled by the user before responding.

Rather than requiring the client to make a response, automatic transaction approval and rejection is also possible as is described elsewhere in this application. For example. If an eFFT module is located on the client's computer then the merchant's website (e.g., using a Java applet of the browser) and the eFFT service may both communicate with the eFFT client-side module to automatically confirm that the transaction is occurring from a computer which is associated with the credit-card. By way of illustration, the merchant server may send transaction information such as the amount of the sale to the e-FFT device. When the eFFT service contacts this e-FFT device to confirm that it is installed on a verified computer, it will also look for the information sent by the merchant in order to cross-validate the transaction was issued from that computer (See FIG. 1B, system components 101 and 149). Although such an automatic validation is possible, consumers may wish to manually approve the transaction as long is this is done almost immediately and effortlessly by selecting 'accept' or 'reject' seconds after the transaction is requested.

Figure 8A:
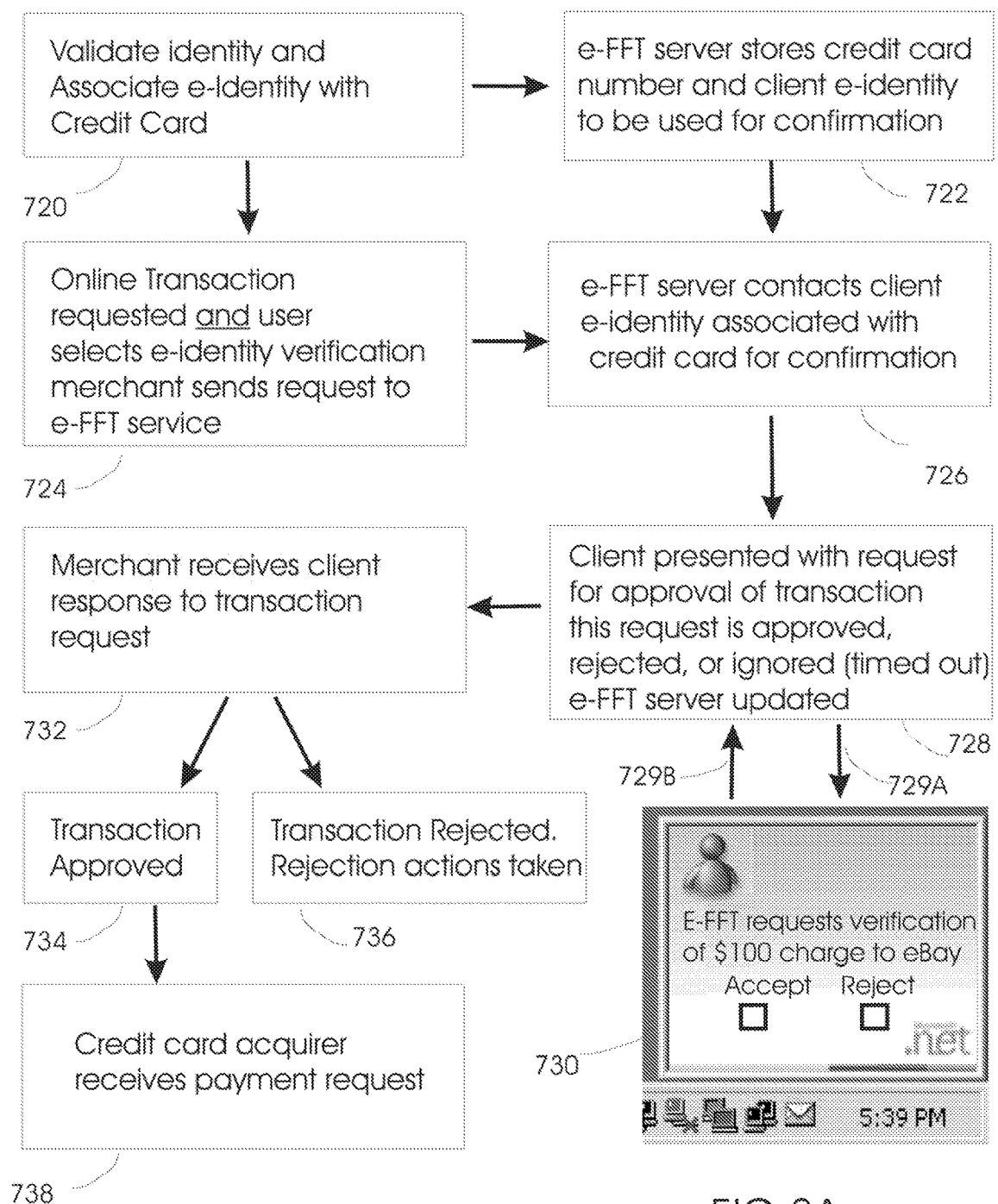
FIG. 8A is a flow chart of an exemplary process which is accomplished within a Fraud Free Transaction Network which provides real-time transaction requests to e-identities associated with a client, who either approves or rejects a transaction, before it is sent as a request to an acquirer.
Figure 8B:
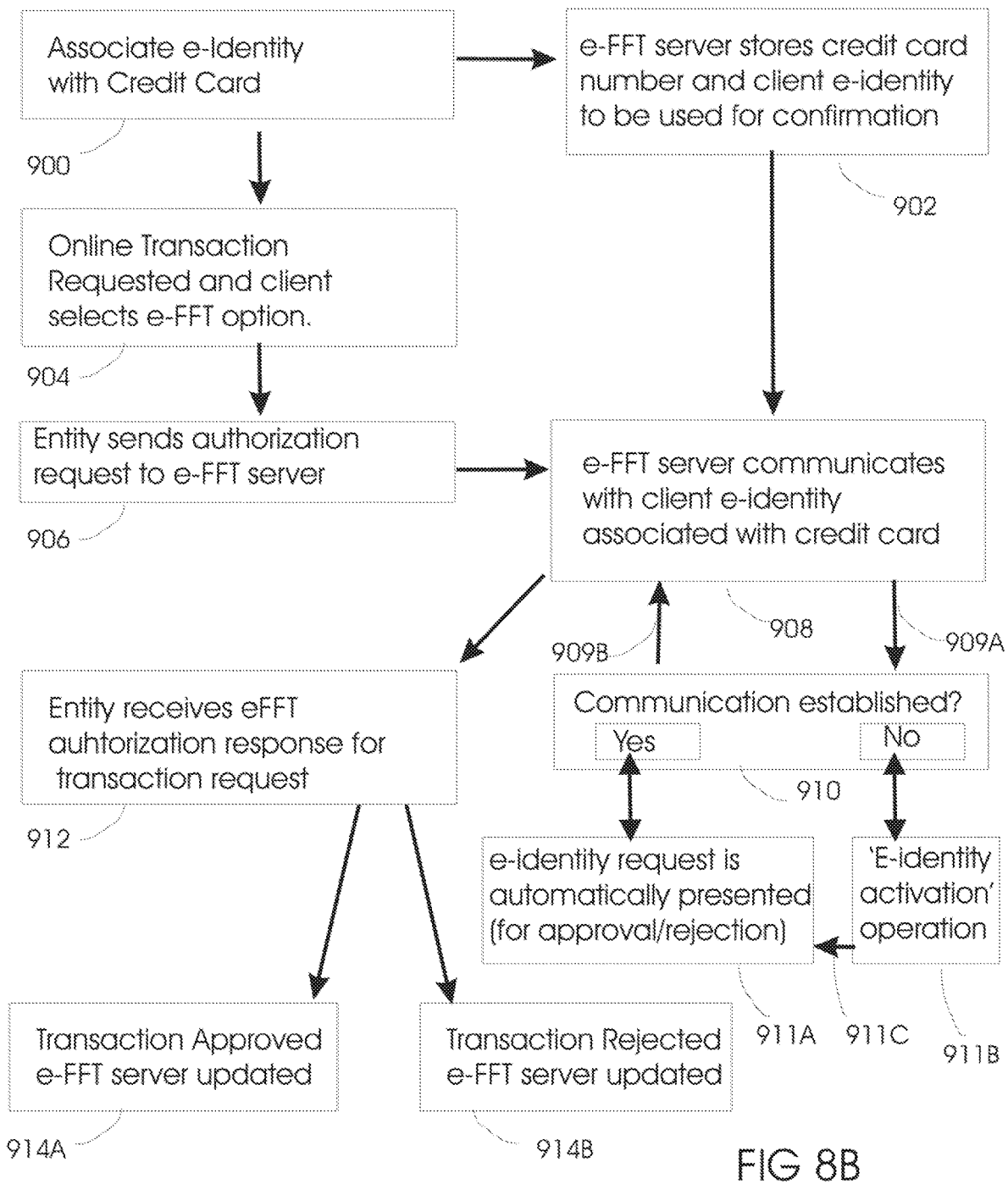
FIG. 8B is a flow chart of an exemplary process which is accomplished within a Fraud Free Transaction Network system which attempts automatic presentation of real-time transaction requests to e-identities associated with a client.

A second embodiment of the method is shown in FIG. 8A which is especially well suited for use by merchants without the participation of credit card associations or card issuers. The first step is again to validate a client's identity and associate this identity with a credit card 720 using one of the methods that has been described. The eFFT server wilt store the card number and e-identity association in its database to be used for subsequent approval of transactions 722. When an online transaction occurs and a user selects an e-identity verification option, then the merchant sends an approval request to an e-FFT service 724. The e-FFT service then contacts the e-identity associated with the card 726 in order to obtain a client input response of 'accept' or 'reject' 728. In step 728, the e-identity sends the client a request for either approval or rejection of the transaction. In this example, this occurs using an e-identity which is MSNmessenger™ which sends instructions 729A to the MSNmessenger™ module which displays a pop-up window-730 on the client's computer that details the transaction and requests the client's response. The client selects either 'accept' or 'reject' and then this client response is sent back to the e-FFT server 729B where it is relayed to the merchant 732. This causes the transaction to be approved 734 or rejected 736. In the case of an approval, step 734 is followed by the merchant sending a credit card acquirer a transaction request 738.

The FFT can be configured to send confirmation message using MSNmessenger™, Yahoo!Messenger™, AOLInstantMessenger™, Pidgion™, and other presence and IM systems. Since hundreds of millions of uses have already established accounts allowing the e-identity to be realized in this manner uses a security feature which taps into existing digital communities. The display pop-up can also be incorporated into various toolbar packages such as Google Toolbar™, Yahoo Toolbar™, and the like. In one embodiment, a system for increasing the security of e-commerce comprises: a first server-side software module which implements a digital shopping cart program which requires a remote confirmation signal prior to authorizing a pending transaction; a second server-side software module configured to contact a participating member of a remote IM service using membership contact information which is associated with, payment information which is supplied for this transaction; a third software module configured to operate within the messaging service and to display a request for payment confirmation from the member, and to relay to the first server-side software module the resulting input response provided by the member which is either a confirmation signal or a rejection signal.

An alternative embodiment of the method is shown in FIG. 8C which shows a flow chart of an exemplary process which is accomplished using a Fraud Free Transaction Network system. This process includes steps which attempt the automatic presentation of real-time transaction authentication requests to e-identities associated with a client, and also includes alternative steps which occur if this automatic presentation is not possible, in the first step the client associates an e-identity with a credit-card 900. This step allows the eFFT server to store an information link between the card number and the client e-identity 902. At a subsequent time when the client wishes to perform an online transaction, the client selects to authorize the transaction using the eFFT option 904 that is provided as part, of the payment process. An entity, which can be the merchant, card association, or other party participating in the transaction, sends an authorization request to the eFFT server 906. The e-FFT server then performs a set of operations which attempt to establish communication with the e-identity associated with the card 908. The server sends a communication/presentation request to the e-identity 909A and determines if the client's e-identity is active ('yes') or is not active ('no'). For example, if a client is logged onto their e-identity ('active') then the method follows along step 911A and presents the approval request to the client via a taskbar-popup window. If the e-identity is not active, and the client cannot be contacted, then the eFFT server can send, relay, or establish a link between the client to a login page (e.g. displayed within a frame of the current page) which is associated with the e-identity service (e.g., the client's IM hosting service) and after the client successfully logs in 911B then the transaction can be authorized, either automatically or by progressing along 911C so that step 911A occurs. When moving from 911B to 911A, additional steps can occur such as performing fraud analytics which assess whether the client is on an e-FFT registered computer, whether the client is located in a geographic region that is similar to that previously used for that client, etc. In any case, the eFFT sends the eFFT authorization response to the entity, which receives this information 912 and either approves 914A or rejects 914B the transaction as well as updates the eFFT server. In the case of approval 914A, the credit card can then be charged if subsequent steps related to traditional e-commerce determine that there are sufficient funds (if this has not occurred prior to or as part of the steps just described). If the e-identity which is being used to authorize the transaction includes a desktop program which resides on the client's computer (and which may have a unique ID number or may ensure a unique computer is being used) then this e-identity can provide authorization in an automatic fashion. For example, the merchant's server can send merchant-transaction ID information (both to the client's machine and to the eFFT server) such as a transaction ID number, the amount of the transaction, or other piece of information. When the eFFT server then contacts the client, it will query the client-side eFFT program to see if the merchant-transaction ID information which the eFFT server received from the merchant server matches the ID information that is logged on the client's computer.

FIG. 8C is a flow chart of an exemplary process which is accomplished within a Fraud Free Transaction Network system which provides authentication operations based upon a client's temporary e-identity which is established by a service provider. In step 900 the client associates their e-identity with a credit card. In this instance the e-identity is their client identity with their internet service provider, and the credit card may be the credit card that the client has used to pay for the service. The service may be required to have existed for 3-6 months prior to allowing an identity-card linkage operation to occur so that client legitimacy has been established (i.e. fraudsters can not simply establish accounts with stolen credit cards and then immediately use the accounts to conduct e-commerce). The eFFT server, which can be hosted by the internet service provider or by a third-party service then stores the linkage information 902. When a client connects to the internet then they establish their online identity with their service provider 916. An online identity is a type of e-identity in which an 'online identity' is linked to the client's identity with their internet service provider, which is in turn is linked to the credit card (or to other credit cards associated with an e-identity hosted by an eFFT service). The online identity may include the service provider issuance of an IP address (e.g. an IPv4 or an IPv6 address) as well as an active transaction or session identification number, or various identical embodiments as may be implemented by a service provider (and which allow the service provider to link a dynamic-online identity to the client's e-identity).

In other words, various means may be used to link a particular client to different online identities which are assigned at different points in time. In the next step 918 the client requests an online transaction and the eFFT option is selected in one of two ways. In the first example, the client manually selects the use of the eFFT option, while in a second example the merchant (or other entity) detects that the client has gained access to the internet using a service which supports eFFT and automatically uses, or proposes to the client the use of, the e-FFT authorization as provided via the client's internet service provider. For example, a dynamic IP addresses is assigned, on LANs or most broadband network services and providers, by Dynamic Host Configuration Protocol (DHCP), but are linked to the a subnetwork or subnet of the service provider and can be identified using the Network address translation (or NAT), to identify and utilize the subnetting information (or classful network addresses, or Classless Inter-Domain Routing, and the like) which allows dividing an IP address into two parts: the network address and the host address. The merchant, or other entity can use the IP address to determine that the internet service provider is a participant in the authorization service, and then sends the authorization request to the eFFT server 907, which looks up the client identity which is currently associated with the online-identity, and then verifies whether or not the client—identity has been linked to the credit card being used. Additionally step 922 may occur which performs various anti-fraud analytics and deterrence measures based upon, for example, the client's e-commerce history the merchant's e-commerce history, and the like. The eFFT authorization response is then transferred back to the entity which sent the request and the entity evaluates the response 912 and then performs operations which invoke the next step 914A or 914B, depending upon the authorization response. The client identity is linked to the transaction in the eFFT server so that later the client and merchant can access the details of the transaction. A further additional step may also in which the online identity (e.g., IP address assigned to client for last transaction) is dynamically swapped after the transaction takes place so that a fraudulent merchant is not able to submit that IP with the card number to other merchants in order to fraudulently charge things to the client.

Several method of logging onto a website in a validated manner can occur with the eFFT service such as:

a. the client arrives at a merchant website and is asked to logon by proving personal information as well as a logon/password combination; the client selects an option for providing a logon/password which comprises using an eFFT service rather than entering information directly; the merchant asks the eFFT service to validate the client; the eFFT and client interact and if the interaction is successful then the eFFT validates the client and sends a unique identifier to the merchant along with a validation request.

b. the client arrives at a merchant website and is asked to provide a logon/password combination; the client selects an option for providing a logon request using an eFFT service; the merchant asks eFFT to validate the client; the eFFT and client interact and if the interaction is successful then the eFFT validates the client and sends a unique identifier to the merchant along with a validation request.

c. the client arrives at a merchant website and is asked to logon; the client selects an option for providing a logon request using an eFFT service; the merchant asks eFFT to validate the client; the eFFT and client interact and if the interaction is successful then the eFFT validates the client and sends a unique identifier to the merchant, which is the same identifier that has been used previously to identify that client to the merchant, along with a validation request.

In example a, the identity of the client is known to the merchant, while in b it is not, yet using example c, the client may be identified to the merchant only through the eFFT identification number. Since the eFFT service can also be used to authorize a credit card payment for a particular user, the merchant may accept a credit card payment without knowing the identity of the user, and further, the eFFT service may debit the credit card, or client's bank account, and then send payment to the merchant with a temporary credit card number or by other means, without the merchant gaining access to the client's identity or payment information. In all cases, rather than the client having to provide an e-mail contact, merchant-to-client communication may be mediated using the eFFT unique identification number so that the merchant may not then send communications such as 'promotional offers' to the client without the client's permission.

Sample Screens used for E-Identity Linking, Verification and Payment.

FIG. 9A shows an association and verification screen 750 which is used for linking various e-identities with a specified credit card. This screen would be provided to the client by a card association or a card issuer, for example, after the client has logged on to view a credit card statement for the month. The screen 750 can be configured to display at least 2 verification options to the client. The client may be required to choose at least 1, 2 or 3 options depending upon characteristics of the transactions which will occur such as their financial value, or depending upon the client's credit history, history of chargeback, geographical location, credit score and age although normally only 1 validation method will be used. In this case there are checkboxes 752 which allow the client to select 'yes' or 'no' for whether a particular item of the validation options list 754 is valid for obtaining client approval during subsequent transactions with merchants. The validation option parameters fields 756 allow the user to specify information which will be used during the transaction. The computer-name fields 756A are supplied by the client to indicate which computers have been associated with the card. Button 758A is used to associate the computer the client is currently using, either by running a program on the client's machine, running a module from the client's browser, installing a client side eFFT program on the client's machine, or otherwise. There is also a button 758B to remove a computer from being associated with a credit card. A 'card select/remove' button 751 allows the client to add additional cards to the e-FFT process, including debit cards and cards from multiple card-associations. Further, it can also be possible to register cards from different card associations. In a further embodiment if the eFFT server detects that the same e-identity is already registered with another card, it can query the client about whether the accounts for the two cards should be linked, thereby allowing such features as displaying the purchases for both cards within the same e-FFT history screen. Since the card-association and/or bank which is associating the card for with an e-identity already has the client's information, this is not required here and is available on other screens presented to the client for other tasks they perform.

FIG. 9B shows an alternative association and verification screen 760 which is used for associating various e-identities with a specified credit card. This screen would be provided to the client by an e-FFT service which is not directly related to, or managed by, a card association or a card issuer. For example, a $3^{rd}$ party eFFT service may be hosted by a company such as PayPal. In this embodiment, one might not expect to see 'Verified-by-VISA' provided as an option since this service is provided by the card association itself. However, eFFT can use Verified-by-VISA in order to validate its clients, even though this service is provided by the VISA card association. In one method, the client can first obtain Verified-by-VISA protection from the card-association. In order to associate the card with an e-identity, the client can then perform a purchase from eFFT which requires the client to perform a payment using Verified-by-VISA a single time. By making a small purchase (e.g. 50 cents), from the e-FFT site, and having this purchase be successfully verified using Verified-by-VISA, in order to permit a client to link the e-identity with the card for all future use, eFFT can somewhat effortlessly capitalize upon all validation efforts used by Verified-by-VISA in order to verify the authenticity of its new clients. Accordingly, rather than setting up their Verified-by-VISA account as may occur on screen 750, the Verified-by-VISA option provided on screen 760 will result in a charge to a pre-existing Verified-by-VISA account.

The association and validation screen 760 can also be configured to display at least 2 validation options 764 to the client, although normally only 1 validation method wilt normally be used. Currently merchants require a particular type of validation rather than offering client's a choice, and the choice should not only include eFFT options, but other options as well. Checkboxes 762 allow the client to select 'yes' or 'no' for whether a particular item of the validation options list 764 is valid for use during subsequent transactions with merchants. The validation option parameters fields 766 allow the client to specify information which will be used during the transaction. The password field 766A allows the client to choose a numerical password which must be types into the client's cell-phone (in response to a call or to a text message to which the client must respond) in order to approve a purchase. This feature can also be used with the client's home-phone which is associated with the client's shipping address, or other phone number provided by the client. Additionally, in addition to a numerical code, the client can use a verbal code which is identified by voice recognition. Other phone-based verification techniques are also possible. The 'Verify by G-mail' 764A, or other well known e-mail service (e.g. yahoo.com, hotmail.com), option allows clients to respond to validation requests by responding from their e-mail account. In this case, clients may be required to supply a password in their reply. The 'conceptual password' allows clients to select from pre-existing conceptual passwords or create their own passwords by uploading graphic files which contain images that they have chosen to be used for their conceptual passwords. Part of the e-FFT service is to evaluate conceptual-password sets to ensure these meet certain criteria as well as selecting non-password images which will be provided along with the images sent by the client. As this feature has been described elsewhere in the referenced provisional applications filed by applicant, it will not be extensively taught here except to mention that conceptual password sets can be sets of images with special meaning only to the client and can include: pictures of children and their friends; pictures of pets one has owned; pictures of friends; pictures of certain friends who are on a messenger or social-networking service, these can be selected from the "friends" section of the client's homepage or contact's list; pictures from a particular vacation; pictures of homes, apartments, or landmarks of cities where a person has lived; pictures of medical imaging of particular disease classes or images associated with other specialties in the scientific, technical, artistic, or historical domain. This type of password is much harder for a fraudster to steal since different pictures may appear in different places on the screen during different logon sessions. Even if the client's activity and keystrokes are being recorded by a fraudster, a subsequent presentation of a conceptual password may contain different images, and hence this information from the prior session will not allow access during the current session.

Conceptual passwords can also include album covers, or photographs of famous people (singers), members of favorite bands, members of a particular band, or other conceptual manner of defining the subject content. Pictures can be combined with either textual or pictures of numbers, and the numbers for the password can all be linked by a certain relationship (for example, no numbers that contains the numeral '5' can be chosen, or must be chosen, depending upon the conceptual rule which has been used). Paintings of famous artists may be used, or paintings representing a particular period, or only pictures which, for example, contain the color purple may be used.

The order in which the pictures are selected may also be part of the password. Imposing an order on the manner in which the pictures are chosen decreases the risk that a fraudster will randomly obtain access to a client's account. So for example, if there are 3 pictures of people, the pictures should be selected in the order of age of the people, with firs the youngest, then the middle, and then the oldest. Alternatively, one could use haircolor, where the black haired people are chosen before brown haired people and lastly blond haired people are chosen. By imposing an 'order' contingency, the chance of randomly selecting 3 of 12 images decreases from 25% to $\frac{1}{7}*25\%$ which is considerably lower.

If users send in their own pictures, then these can matched with other pictures which are matched for brightness, hue, contrast, resolution, and other image qualities. The eFFT client may be asked questions which will assist in evaluating the conceptual passwords and matching images with those submitted by other users. For example, the eFFT client may be asked at least one of the following if the client has indicated that the pictures that are being submitted as part of the picture password are of people: what is the average age of people in the picture; were most of these pictures taken indoors or outdoors; what is the dominant ethnicity of the people in these pictures; what was the distance of the subjects in most of these pictures; are these pictures taken in a studio or natural setting? The eFFT client may be asked at least one of the following if the client has indicated that the pictures that are being submitted as part of the picture password are of nature: Are these pictures of flowers?; Are these close up photos or landscape?; Are these of a particular animal? and, Are these of a particular type of plant?. The clients can also be asked to define what the rules are so that the submitted pictures sets can be evaluated. The clients may send in both pictures which are targets and which should be part of the password as well as pictures which are to serve as non-target items.

There is also provided computer-name fields 766B, 766C which permit the client to indicate which computers have been associated with the card. Button 768A is used to associate tire computer the client is currently using, either by running a program, on the client's machine, running a module from the client's browser, installing a client side eFFT program on the client's machine, or otherwise. There is also a button 768B to remove a computer from being associated with a credit card. A 'card select/remove' button 751 allows the client to add additional cards to the e-FFT. Since the card-association and/or bank which is associating the card for with an e-identity already has the client's information, the client is not required to input that information here and this feature is available on other screens that are presented to the client for other tasks they perform.

One event which can cause an automatic request for an increase security is if a client who normally uses a computer from a particular location, logs on from a different location. In this case they may be asked an extra set of security questions. This may be more likely to occur if the eFFT has the ability to detect the computer that the client is using, and the computer is used from a new location as is indicated by TCP-IP information and the like.

As a client associates a number of websites with their e-identity, an increasing number of logon/password combinations will be stored in the eFFT server, which can create a security risk. This can be addressed in several manners. For example, the client may have to provide a secondary password (such as a picture password) into their IM account, as a step in accepting a 'logon-request' from a website where they are signing on using their e-identity. Secondly, the client may be required to have deactivated their 'auto-logon' feature for accessing their e-identity to decrease the risk that an unauthorized user, such as a family member, has simply turned on the computer which is set to activate the auto-logon for the e-identity. Thirdly, the client: may be required to have logged into their e-identity within the last 2 hours in order to decrease the risk that an unauthorized user has simply sat down at a computer where the client was logged on. The merchants and website owners may be able to detect what security features have been enabled by a client and may reject the e-identity logon request, and display a message to the client, if they require higher security than has been enabled by the client.

The eFFT association and verification profile screen 756 can allow eFFT clients to select an order for which at least two of a plurality of verification methods are applied in order to authorize a payment. For example, the client may use the screen to adjust their 'authorization profile' by selecting two different e-identities as well as a preference for the order in which these will be contacted in order to obtain confirmation. If MSNmessenger is defined to be used first and a confirmation or rejection signal is not provided by the client, or if the MSN messenger status is set to "offline" then the transaction may be cancelled by default. Alternatively, if a client has indicated that a Yahoo!messenger e-identity should be subsequently used to procure a client's 'accept' response, then this is then done. An additional third method can be implemented if the first two methods do not meet with success. This last method can switch communication modalities, and reach the client by calling the client's home phone number and obtaining client input over the phone. For example, the client my select 1 to approve the transaction or 2 to reject the transaction and may further be required to provide a numerical password if this has been defined. Alternatively, the eFFT may obtain confirmation by having a client provide a conceptual password. The types of confirmation which are valid as well as the order by which these are attempted, as well as passwords related to different methods of validation can be defined in the eFFT's authorization profile which is defined using screens 750 or 760.

Once the eFFT has been activated and a client's card is associated with an e-identity, then subsequent transactions happen relatively effortlessly and instantaneously, while still providing a high degree of security. An example of a payment verification screen 770 which would be displayed by the merchant to the client is shown in FIG. 9C. This type of payment verification screen 770 may be used in steps 704 of FIG. 7 and 724 of FIG. 8A. In this case, the client can select one or more payment verification options which are selectable using the check-boxes 772 in the 'Y' column which are associated with the validation options list 774. The client has chosen to use (or was required to use) more than one verification feature so that not only must the client respond using and e-identity which is the registered MSN-messenger account, but further the eFFT software on the client's computer will be used to verify that the payment request has originated from a computer which has been registered by the client for use with the eFFT service. Because the client has visited the website before, a credit card number is on file with the merchant 778. The client can also remove or add payment information 776 such as other credit or debit card numbers. The amount to be billed appears in the 'amount field' 780, and the 'confirm payment' button 782 is used to complete the payment transaction and initiate the eFFT authorization process. This example shows some of the great benefits of the eFFT service. After linking the card with an e-identity, subsequent purchases simply require the push of a button (and entering the credit card information if the client is new to the merchant site). The eFFT server will automatically lookup the e-identity which is associated with the card number and will forward the payment validation request to the client, who can click to 'accept' or 'reject' the payment within seconds. While the eFFT can store a record of this transaction which it associates with the e-identity, the transaction number can be sent to the entity requesting the authorization, but the entity does not obtain information regarding the actual e-identity name which is used by the client. This prevents non-eFFT entities learning any specific information about which cards are linked with particular e-identities. Ensuring that the transaction came from a registered computer can also be incorporated into the eFFT approval process in order to increase security, and is automatically accomplished in less than 1-3 seconds. The eFFT system and method is thus much simpler, faster, and effortless than prevailing current methods and can be universally provided by the internet e-commerce community. The e-identity approval process can adhere to this simple structure or the eFFT or e-identity server can impose additional rules on how the client's response is obtained. For example, the client may be required to have logged onto the online-community within the last 2 hours (to decrease the risk that the client is not the one using the e-identity), or the client may be required to provide an additional password to confirm payment. However, rather than having to memorize many passwords for different payment schemes and sites, the eFFT service can provide a single password for payment on many sites and with various cards.

A service such as PayPal can use the eFFT feature of associating a card, or account, with an e-identity and a device in order to rapidly validate purchases in a user-friendly manner. Further, this type of technology can be added on top of PayPal's existing architecture to provide a further level of protection to their clients. By illustration, PayPal information is first associated with the e-identity. Then the client provides their PayPal identification (or their card number) in order to make a payment during the transaction and presses 'make payment' on the merchant website. Similar to systems and methods already described, Paypal then sends the confirmation message to the e-identity associated with a device, which allows the client to press 'accept' or 'reject'. As in the other embodiments, the client may also be required to enter a password, or use a eFFT-registered computer when the purchase meet conditions such as being over a specified amount or being shipped to a non-billing address. This provides, almost instantly, and with minimum effort another layer of protection against fraud since the fraudster would have to also have access to the e-identity account as well as the card or PayPal information. Although major IM networks have numerous security features intrinsic to them and an added feature of he IM-based notification is that it will instantly alert the actual client if someone else has logged in with their identity on a different computer, leading to increased fraud deterrence.

In a last exemplary embodiment, FIG. 9D shows an alternative payment verification screen which may be provided by a merchant and which allows a client to simply designate that the eFFT system should be used authenticate the purchase using a particular card. The payment verification screen does not present various e-identity options to the client since the client's preference is stored in the eFFT server. In other words, after the client has specified (with the eFFT service) which e-identity (e.g. a specific IM identity) is to be used for communicating information during e-transactions, the eFFT will automatically contact this service when a request is issued by an entity using a credit card number which it is trying to verify as belonging to the client.

e-FFT Implementation within Card-Association Transaction Flow.

Figure 10A:
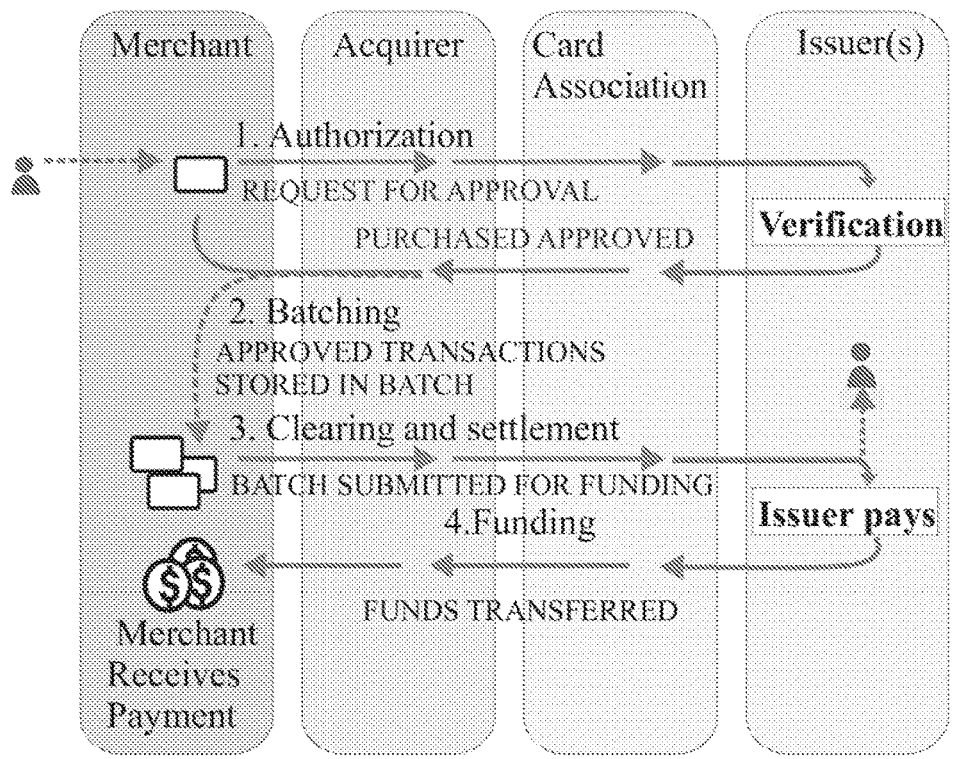
FIG. 10A is a flow chart of an exemplary illustration of the steps which occur in a generic credit card payment process that can include eFFT-based verification.

FIG. 10A illustrates information flow that occurs during a typical credit card transaction. The 'client' or 'Cardholder'

(the owner of the card used to make a purchase) provides her card to the 'Merchant' (the business accepting credit card payments for products or services sold to the cardholder) who then sends a payment authorization request for a specified amount; to an 'Acquirer' (a financial institution or other organization that provides card processing services to the merchant). The acquirer forwards this payment authorization request, to a 'Card-association' (a network such as VISA®, MasterCard®, AMEX®, and others), that acts as a gateway between the acquirer and issuer for authorizing and funding transactions, which forwards this request to the 'Issuer' (the financial institution or other organization that issued the credit card to the Cardholder) for approval (Figure adapted from http://www.bankofamerica.com/small_business/merchant_card_processing/). If the Issuer approves the transaction then this information is passed back to the merchant who then initiates the next process (clearing and settlement) in which the funds are deducted and which results in the actual funds transfer to the merchant. The eFFT technology systems and methods can be applied to any of the participants of this process, using methods such as the two examples which are provided in FIG. 9A and FIG. 9B. The eFFT technology may prove to be most effective when hosted by the credit card issuing bank. All of the authorization requests for payments eventually reach the credit-card issuing bank in current transaction methods. For E-commerce/online transactions this authorization request is performed in real-time. This happens usually on the merchant website while the user/consumer is presented with a progress bar indicating the transaction is being processed. An eFFT System hosted by the bank will provide the bank with the unique and powerful ability to authenticate the user, and verify the transaction in real time by having the eFFT credit-issuer side system identify the user and device based on the credit card number sent for approval, and call in real time to the eFFT client-side application requesting verification and approval (or rejection) of the transaction. Moreover, the eFFT technology can be used during pre-authorization 'holds', authorization/verification, clearing and settlement, as well as issuer payment operations (including funding and transfer), and post-transaction activities. The technology may also be incorporated into, and provide mechanisms to initiate and track, chargeback operations, charge dispute resolution, cardholder billing, transaction recording, and creation and maintenance of merchant and client profiles, as well as reporting and generation of member profiles (as occurs with member feedback on sites such as e-bay). The e-commerce validation method can also include steps comprising an establishment of an 'authorization hold' (termed also 'card authorization' or 'preauthorization'). The e-commerce validation method may also be applied to debit cards.

Figure 10B:
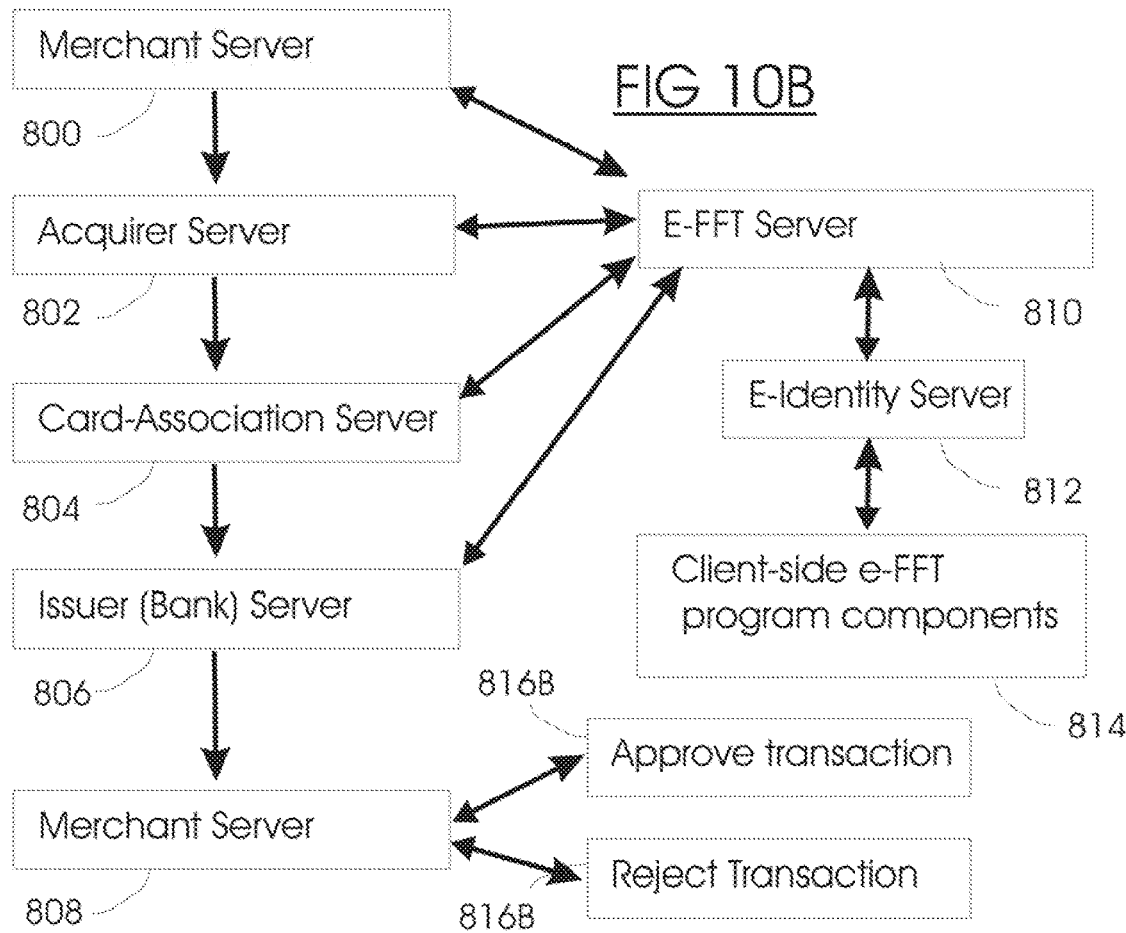
FIG. 10B is a flow chart of an exemplary eFFT system which may be incorporated into the steps shown in 10A, by servers related to the merchant, acquirer, card-association, and card-issuing bank, so that transactions may be contingently approved using a client e-identity.

FIG. 10B illustrates a system which may be implemented during a typical credit card transaction. Generally, an internet-based e-commerce transaction request is passed from the merchant server 800 to the acquirer's server 802 to the card association server 804 to the issuer (bank) server 806 which provides the verification that funds are available. This verification signal is transmitted back to the merchant (either directly or via the same or different steps occurring in reverse order) to indicate whether the transaction is approved or not. As mentioned previously, eFFT technology will prove to be most effective when hosted by the credit card issuing bank, and when the bank users download the eFFT client-side application from the credit card issuing bank. All of the authorization requests for payments eventually reach the credit card issuing bank. For E-commerce/online transactions this authorization request is performed in "almost" real-time. This usually happens on the merchant website while the user/consumer is presented with a progress bar indicating the transaction is being processed. An eFFT System hosted by the bank will provide the bank with the unique and powerful ability to authenticate the user, and verify the transaction in real time by having the eFFT credit-issuer side system identify the user and device based on the credit card number sent for approval and call in real time to the eFFT client-side application requesting verification and approval (or rejection) of the transaction. This presents the strongest method for fraud prevention available today. As indicated, any participant in this process may establish two way communications with the eFFT server 810 in order to validate the purchase using a verified e-identity. The eFFT server 810 will then communicate the validation request to the e-identity server 812 which will forward this to the client-side e-FFT program 814 which displays this request to the client in order to obtain the client's response. The servers can communicate with the eFFT server 810 during any step of the e-transaction, as well as during post-transaction follow up steps of the method. The servers can communicate with the eFFT server 810 during authorization, verification, batching, clearing and settlement, and funding steps displayed in FIG. 10A. In the preferred embodiment, selection of transactions which may be slated for eFFT processing are those which have an ECI (Electronic Commerce indicator) in the transaction identification information. Additionally although the term server is used here and elsewhere in this application, this terra can refer to a service which is realized using a plurality of servers, which may be physically located near each other or which may be organized in a distributed fashion, with redundant capacities in order to address outage with respect to any part of the service, as is well known.

Historical Transaction Activity and Merchant to Client Communication

Figure 11A:
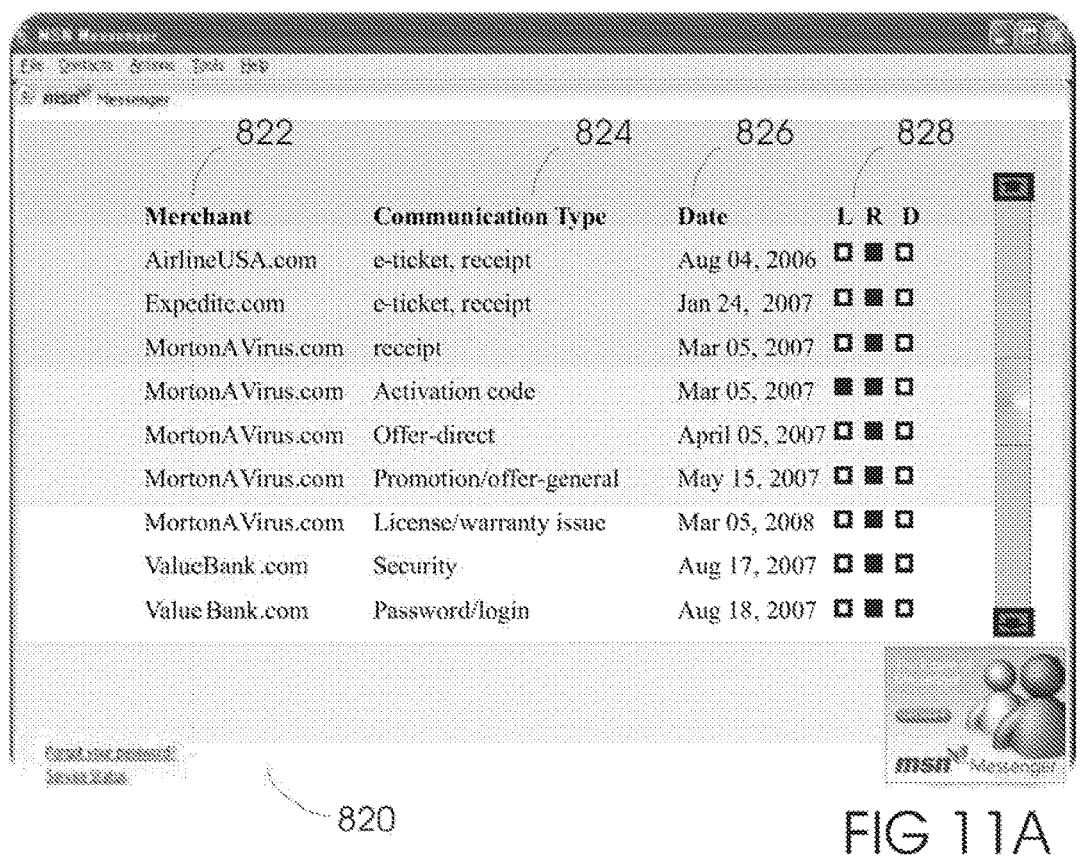
FIG. 11A is a transaction history screen showing transaction events as a function of merchant, communication type, and the date of the transaction. Graphical controls for managing these transaction events are also shown.

The e-FFT technology can be configured not only to enable increasingly secure transactions but also for providing information storage for records of these transactions. This centralized storage, or 'transaction history', includes features which are customizable by the client, and are defined as part of the client profile, FIG. 11A shows an example of a client's transaction history screen 820 in which information is organized by merchant 822, transaction/communication type 824, and transaction date 826. The client may use graphical controls 828 to adjust what and how information is displayed and stored, and what types of information are deleted. This example displays transaction information sorted first by merchant name, then by date. The information which is stored for each transaction item can be provided by the merchant during the validation process. For example, the entry listed as "AlirlineUSA.com' is of the type 'e-ticket, receipt'. This transaction entry can be sent by the merchant to client via the eFFT service after the payment has occurred, but before the transaction is finished, or may be sent after the transaction is completed. In the latter case, the 'merchant-to-client communication' can use a transaction ID #, which may be issued by the eFFT service, or the merchant, or in another manner during the initial transaction. In one embodiment, the merchant can send the receipt for the transaction to the eFFT service along with the merchant ID # and transaction #, and the eFFT service will forward this to the client. This entry can include only information specific to the payment which was made, or an HTML/text/pdf copy of the e-ticket itself, or both. In the case where the transaction information includes an Activation code, as may occur in the case of a software purchase, both the receipt and activation code can be transmitted at time of purchase or afterwards. The client can find out more about any of these items by clicking on the transaction entry, similar to what would occur with commonly used e-mail applications. This can also allow the client to initiate 'client-to-merchant communication' using IM or other communication method.

Graphical controls 828 can include check-boxes which are used to adjust what information is stored locally (L) in a client-side eFFT database located on the client's computer, remotely on the e-FFT server (R), or which will be deleted after the current session (D). Similar to e-mail programs, all entries for a given merchant or type of transaction may be sorted and organized into folders. The transaction, history screen 820 shown in this example, has been implemented as part of an MSNmessenger IM client-program and many of the features can be realized within the MSN IM network, as modules located partially or wholly on the client's computer or using remotely implemented modules of the MSN network that interact with the MSN client-program interface of the client's computer. The eFFT technology can be incorporated with a variety of existing e-services (e.g., messenger communities, social communities, professional communities and the like) and the history screens can be configured to reflect the look and feel of the e-identity service which is used with the eFFT technology.

The transaction history screen 820 displays entries directly related to the transactions, and also includes items subsequently transmitted from the merchant. Both merchant-to-client and client-to-merchant communication is adjustable using the e-FFT technology. In one embodiment a client is able to customize the types of merchant-to-client communication which is permitted. The client can adjust the merchant permission parameters for each merchant, and this becomes part of their client profile. For example, the client may click on any item in the transaction history screen 820 and then invoke the merchant permissions screen 840. In the example shown FIG. 11B, the client has used the merchant permissions screen 840 to configure the merchant permission parameters for AirlineUSA.com to allow 844A that merchant to send communications relating to the information class which includes e-tickets (i.e. the e-ticket itself), and the receipt for the ticket 842A. Further the client has configured the class properties 846 of merchant permission parameters so that certain information of a particular information class is stored for 60 days and then deleted. The client has allowed the use of a pop-up window to occur if they are logged onto the e-identity used in this case (i.e., MSNmessenger). The merchant AirlineUSA.com is also permitted to send information about the e-ticket, including updates on flight delays and cancellations. The client has also allowed communications for the password and login information class 842B, such as can be automatically forward to the eFFT server when a client performs a password reset on the merchant's website or using other means. The client has denied communications from this merchant which are related to promotions and general offers information class 842C.

Figure 11B:
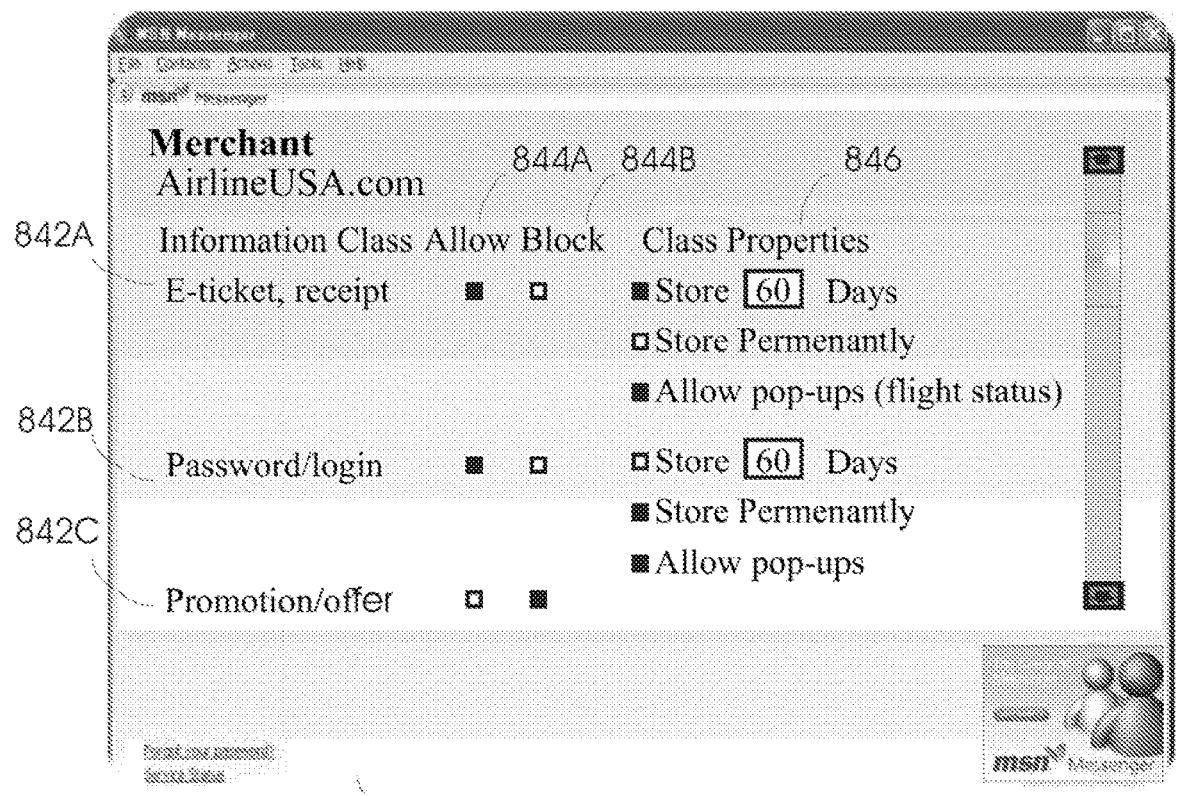
FIG. 11B is a merchant permission screen which is part of the e-FFT client profile which the client uses to modify merchant permission parameters for different information classes.

The merchant permissions screen 840 of FIG. 11B shows a simple example of how the client can determine what types of communications to allow for various merchants. Obviously, additional types of information/communication classes 842 can be defined for other types of transactions. With respect to software, the information classes can include activation codes, expiration/warranty information, troubleshooting tips, educational offers, etc. Likewise, various other types of class properties 846 are also possible including: local/global designation as to whether this applies only to the current computer or to all computers; filter setting for types of words or communications which are received: and whether to display pop-up advertising from $3^{rd}$ parties, for example, which are related to a product which has been purchased. The client can also set merchant permission parameters such as class properties 846 in order to "control periodicity" of the communications from a merchant. Communication can, at least for certain information classes may only be permitted once a month, once every 3 months, or once a year. Additionally, a parameter entitled "combine with group" allows the communications of certain types (e.g., promotional offers) from ail merchants to be permitted or displayed only on a given day (e.g. the $1^{st}$ of each month). In this manner clients can select a particular time when they are willing to review merchant related information. The client may set merchant parameters for particular merchants so that various types of messages are automatically forwarded to an e-mail address or sent as a text message to a mobile phone.

Merchant-To-Client Communication with Message Profiles

Figure 12A:
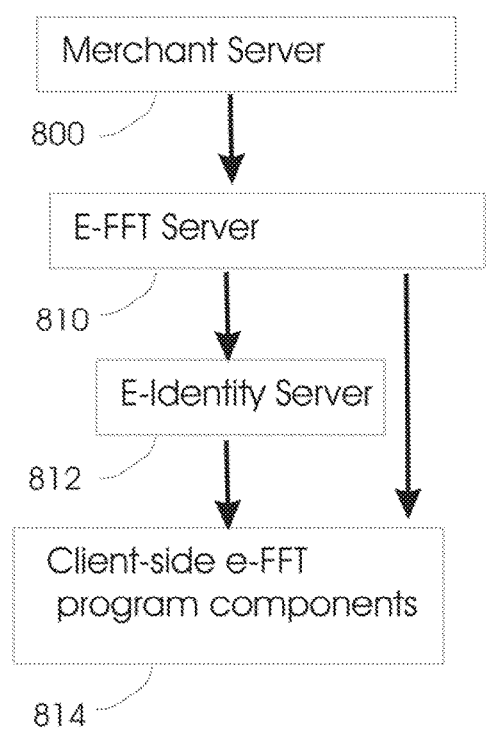
FIG. 12A is a flow chart of an exemplary eFFT-based system which permits selective merchant-to-client and client-to-merchant communication, in accordance with merchant permission parameters.
Figure 12B:
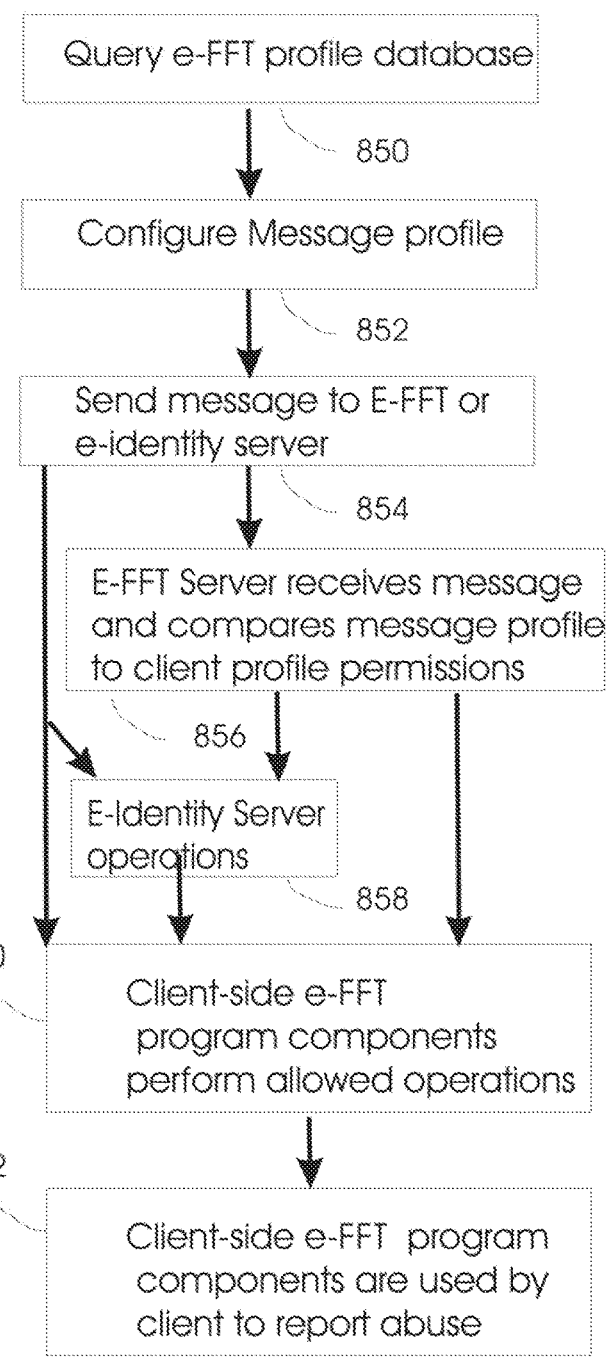
FIG. 12B is a flow chart of an exemplary eFFT-based method which permits selective merchant-to-client and client-to-merchant communication, in accordance with merchant permission parameters.

This type of selective merchant-to-client communication is realized using message profiles which the merchant creates for each message that is sent to the eFFT server to be forwarded to a client. The message profile is created as a message header containing fields for information such as: company name; company e-FFT identification code; information class; original transaction number for which this message is relevant and other types of information that is relevant to identifying the attributes of the communication. The message profile can also contain message display parameters which dictate how the message should be displayed (i.e., should the message be presented as a pop-up message if allowed by client). In FIG. 12A a system for implementing selective merchant-to-client communication is shown. The merchant, using the merchant's server 800 sends a communication to the client through the eFFT-server 810 which forwards the message to the client-side eFFT components 814 either directly (in the case where the client has installed an eFFT module on their task-bar) or via an e-identity service 812 if the eFFT is implemented jointly with this service. By sending communication in the opposite direction, selective client-to-merchant communications, regarding transaction, can be provided. As described, a client may initiate this communication by clicking on the transaction entries of FIG. 11A. FIG. 12B shows an exemplary method which is used with the system of FIG. 12A. The message is configured by the merchant 852 (including the message profile) and then sent to the eFFT or e-identity server 854. The eFFT-server then compares the message profile to the merchant permission parameters of the client profile and determines whether it should forward the message to the client 856, and if so what actions are to take place (e.g., present message in a pop-up window). If the message is acceptable as defined by the client, then it is forwarded to the e-identity service 858 which then forwards it to the client who views it as a function of the client-side program operations 860. Step 860 can also occur, at least in part, using a website (e.g. Facebook web-page) to display the e-identity material. Alternatively, the eFFT service 854 may simply relay the merchant messages to the e-identity service 858, or to a client side application 860, which is responsible for filtering messages according to the merchant permissions set by the client. In one embodiment, the profile settings which the client sets for a particular merchant may be relayed to the merchant so that the merchant can store these in an e-FFT profile database and use this information 850 to adjust communication to occur according to the client's preferences 852. For example, if the client sets parameters of a merchant in the client's profile so that the merchant is only permitted to send communications 1 or 2 times per year, then the merchant itself is responsible for monitoring its communications to this client to ensure that this request is respected. In this embodiment, the merchant rather than the eFFT service, is responsible for ensuring that the client obtains only communications which have been authorized. Because this embodiment (and other embodiments described) of the method causes the merchant-to-client communication to be regulated by the e-FFT service (or e-identity service), it is easy for the eFFT to address abuse. For example, if a merchant sends a communication to users and mis-labels the information class of the message profile as 'relevant to flight' when really the content is related to special offers being made by the airline, then clients can alert the eFFT service to this abuse 862. If a company mis-classifies information being sent to clients more than a selected number of times, then the merchant's ability to send communications through the eFFT network may be suspended, the merchant may be fined, or other penalty may be imposed. The eFFT technology described here can also be implemented by a PayPal type of service rather than a credit-card service. The user of a client-side program which provides the features of accessing payment history and for merchant-to-client communication can occur through a PayPal service hosting the e-FFT server technology. FIG. 12C shows an exemplary method for accomplishing recurring billing which is used with the system of FIG. 12A. The method describes the usage of the systems in FIG. 12A in the context of recurring billing transactions which are a prevalent and growing method by which to charge customers (especially electronic card-not-present CNP customers who purchased products online) for different type of services that are offered by a merchant. A client, who agrees to buy a product 872 from an online merchant's eCommerce platform 872 and also agrees to enter into a recurring billing agreement 874 with the merchant, initially confirms this with the eCommerce Platform/merchant server 876. The eCommerce Platform/merchant server will then communicate with the E-FFT server at a specified time (that can be controlled by the consumer, merchant, or otherwise) prior to at least the first upcoming/recurring billing date. After the merchant establishes connection with the eFFT server, the eFFT server instructs the e-identity to relay the pending/upcoming recurrent billing notification and details about the actual billing amount, and date specified to the target e-identity 878. The e-identity server then accomplishes all communication with the target eFFT client-side components 880 so that the client will receive the notification and provide a client input response to the target e-identity. The client-side eFFT components will notify the consumer of the upcoming billing event or the billing event itself 882. The consumer can then select to accept, or reject the transaction 884. In the case of a rejected transaction user will be provided with a set of options including the ability to communicate the reason for the cancellation and the ability to communicate with that merchant's customer support representative instantaneously in real time 886 using VOIP, chat, or phone. If the user accepts the transaction, E-identity server is notified and passes the approval response to the eFFT server. The eFFT server in turn communicates the approval to the merchant's server to submit for authorization (or the credit card association or both), and merchant bills the client on the indicated billing date 888. If a client rejects a recurrent billing event and then continues do so after contact with the merchant, then the merchant can the review all of the data provided by the eFFT and the e-Identity servers 890 and then take actions that are specific to the merchant's business operation and policy 892.

Clients who do not wish to get communications from a merchant in the future may simply choose to block (by adjusting merchant permissions of client profile) communications from merchants who choose to send spam, (merchants may be able to gain access to the fact that a client has set this preference in their profile). Another feature of the eFFT system is that only merchants with whom the client has conducted a transaction may be permitted to send communications to the client through the eFFT servers.

The provision of merchant permission parameters within the client's profile enables eFFT clients to determine how (e.g., pop-up window or not), when (e.g., once a month), what (e.g., flight offers), and who (only merchants for which client has performed a transaction), is able to communicate with the client and increases the likelihood that only relevant information to be sent to the client. This is an advantage to merchants because the client is more likely to reach material which is transmitted according to their preferences, and the communications are less likely to simply be deleted or accidentally quarantined by a spam filter algorithm. At the current time, only 1 out of 5 e-mails are non-spam related due to an exponential increase in spam related measures. The increasingly sophisticated spam methods are making it much harder for anti-spam countermeasures to occur without deleting legitimate e-mails, especially those having commercial-based content (The New Yorker, August 2007). Because clients can opt-out of receiving various promotional materials from merchants, merchants can use promotions to entice clients to allow communications in their merchant permissions. For example, rather than sending out "great offers" which are really not that great, merchants can offer increased discounts which the client will only see if they allow these types of information classes of communications to occur for that merchant. This type of direct marketing is likely much more relevant, efficient, and user friendly then sending out millions of e-mails to clients who are largely ignoring and deleting the material and is much closer to the type of targeted marketing (e.g. AdSense) winch companies such as Google aim to provide.

Of no little importance is also the features of the eFFT system which deter the success of Phishing, Pharming, Visiting, and other types of identity theft and fraud. Only eFFT-certlfied merchants can use the eFFT service, and since merchants connect to the eFFT clients using secure, encrypted techniques, rather than mail programs, breaking the system is much harder. Even if a merchant's eFFT server is hacked, the subsequent communication will still occur through the eFFT service rather than the internet. Rather than making a site that looks like the merchants site, or sending out e-mails with assumed identities, attempts at compromising the integrity of the eFFT system would entail actually hacking into, and manipulating, the merchant's servers.

Extending eFFT Functionality to Logon and Password Operations.

In a further embodiment the eFFT service can store logon and password information which the client has stored for different sites and can be used to log onto various sites by having the client 'accept' or 'reject' a logon request which is sent to the eFFT service from a merchant website. In other words, rather than associating a credit card with an e-identity, the user can associate their e-identity, such as an IM id, with the logon and password information in addition to unique device credentials. This can be clone using an eFFT profile screen or simply by having the client choose 'associate this logon and password with the following e-identity' during the first login session, the merchant then either sends the login and password information to the eFFT site linked to the e-identity or simply links this information internally so that in the future the client can gain access to the she using the logon and password information, the e-identity, or both. Clients can also manually enter username and password with IM service. The merchant can then provide a field which says 'logon automatically using IM verification' and the client enters their IM client identification. This is sent by the merchant to the e-FFT server which forward this to the client who provides an 'approve' response. In a simple implantation, when returning to the site, the client can type in their IM identification rather than a logon and password info, the site will forward a logon-request to the e-identity, where the client can accept or reject the logon request. This may be sufficient for the site requesting logon validation, but alternatively, the eFFT may lookup the logon and password associated with that site and send that back to the requesting site along with an 'accept' response to the validation request. This enables the eFFT system to serve as a centralized system for logon and password storage/access as well as a secure payment system. eFFT system can also be used by the client to add or remove additional shipping addresses which are acceptable. Numerous variations on this theme are realizable, but the central concept is that the client may gain access to a internet site or service by verifying identity using the e-identity rather than using traditional means. This is a great asset to clients who are frustrated with trying to remember passwords to many different websites. Similar to the merchant permission parameters, clients can configure how they are contacted by particular websites and can also block communications and logon requests from any website. Further, only websites with which the client has linked their e-identity can send logon-requests to the client.

Alter the eFFT has been locked to a specific computer a client may wish to want to add another computer. The client may add a second computer by logging onto the eFFT website using a name and password and then downloading or operating an eFFT program which registers this second computer. Alternatively, the client may be required to logon only from first the first registered computer and obtain an eFFT application which can have a unique serial number, which they then install on the second computer within an interval such as a 1 week period. Alternatively, the client can request an 'add computer token' to be provided to the messenger e-FFT server. The server can store this 'token' for an interval such as up to 1 week. When registering the second computer the client performs an operation (e.g., downloading an executable to the second computer which registers it with, the client information) which uses up this 'add computer token'.

In one embodiment, when clients use e-identities to logon to various websites, merchants are able to obtain information about the security level settings which are required for the client to log onto their e-identity and/or to provide client responses to the eFFT approval requests. If the merchant does not believe that the secure level is high enough the merchant can inform the client that, the security settings must be increased before the merchant will allow the client to use their e-identity for approval during a logon or other process. For example, logging onto e-bay may be done with a relatively lower security level than may be required to use an e-identity to log onto a banking or other financial services website.

Reaming Billing:

Most prevalent to the sale of software applications and subscriptions made through online services, is the accomplishment of recurring billing arrangements wherein the client is billed on a selected number of recurring and periodic time intervals. These intervals are usually determined by the merchant and rarely by the consumer selecting one ore more dates on which the billing is to occur. Two main drawbacks to the use of recurring billing are:

a. Lumped-chargeback incidents due to fraud: If a fraudster assumes the card or identity of a legitimate client, it presents a problem to the merchants, banks and obviously to the consumer with respect to recurring billing. Upon discover of one or more recurrent, billings charged to the client's account, for a product/subscription which was not authorized by the client, the client may immediately dispute these charges. This situation causes the merchant to experience multiple chargeback transactions at a single time. This type of incident can place a merchant, especially a smaller merchant, in a higher risk of being monitored by card-associations and may add additional operating costs such as are related to changing operations procedures. Additionally, actual fines can be applied, to the merchant by these associations.

b. Lumped-chargeback incidents due to legitimate use: A legitimate consumer can decide to purchase a product and/or service/warranty that results in recurring debits to a credit card. If the item/service purchased do not meet the client's expectations or are otherwise deficient, resolving these issues may often be a complex process involving contacting the company by email or phone. Even after the client contacts a company to request for the recurring billing to stop or to try to resolve a problem, there may be misunderstanding and the client, may experience further billings which will then be disputed and may result in multiple chargebacks. If that process is too cumbersome, this recurred billing transaction can immediately become a charge back against the merchant which is again is costly and always preferred to be avoided by merchants.

In one preferred embodiment, the eFFT technology uses an e-identity linked with a presence and IM service to provide merchants with the ability to offer real-Time recurring billing notification and where a 'request for approval' is periodically made to the consumer via the eFFT messaging network. At every authorization request for a recurring billing, the merchant will hold the authorization request to the acquirer or the issuing bank (depending on the model used) until the consumer has approved the billing notification via the eFFT messaging network interface. If approval is not given, the issue can be resolved by the client and merchant over IM or other means. This technology prevents fraudsters from being able to use stolen credit cards to purchase subscriptions or product that have a recurring billing transaction, and prevents multiple-chargeback incidents related to this type of fraudulent use. Additionally, with respect to legitimate transactions, if the consumer is not satisfied with the product/subscriptions purchased, then the merchant does not automatically bill the credit card and avoids having multiple charge-backs to their account. Utilizing this technology, will also provide the merchant with a new and efficient indicator of customer satisfaction and offers a new manner by which to contact dissatisfied consumers and provide solutions such as providing a new or alternative product, or discounts for the current product, or other solutions so that sales are not lost completely.

Overview and Considerations

Currently e-commerce is often implemented in a complicated and messy fashion, occurring in a distributed fashion across a client's browser, $3^{rd}$ party payment services, and e-mail confirmation, and the like. Security and authentication is an issue at many levels and steps of the operation. This leads to a number of disadvantages addressed the inventive systems and methods taught herein.

The current invention combines a number of technologies to provide a system which focuses solely upon e-commerce. While browsers are used for browsing the internet, the e-FFT technology, rather than the browser is used for payment. Further, tire e-FFT also provides for communication between clients and merchants rather than relying upon conventional e-mail, which is a large mixture of unrelated content relevant to both personal and professional communication, and which is plagued by issues of spam, phishing, and pharming. By storing records of information according to purchases, the eFFT provides the client with an efficient and organized manner of retrieving information related to various e-transactions. Farther, by using centralized information storage, if a computer crashes, then information such as how to obtain one's extended download service in order to re-install software will be easily accessible whereas normally this is lost. The direct marketing feature allows clients to avoid unwanted spam and to customize the types of content to which they are exposed. The e-FFT technology is also beneficial because unlike currently implemented solutions, the technology can be realized as part of a number of existing platforms and services. While it may be realized independently as a toolbar component or executable, it may also be combined with services offered by existing e-communities and e-networks. It can also be used in combination with current payment services in order to facilitate and augment security and validation issues.

The client-side software program (engine) can be designed for installation, execution, and/or operation within handheld devices, such as PDAs (e.g., blackberry), cellular telephones (e.g., iPhone), pagers, landline telephones, portable computers, and other communication devices in order to notify eFFT users of payments and to obtain client responses that allow confirmation/rejection of payments. The term credit-card is extended to debit cards, credit accounts, RFID payment technologies, and other credit-based monetary systems and exchanges which allow for exchanges of value between two or more parties. The e-identity validation method can also be used with cell-phone payment transactions (the phone or PDA is contacted by the eFFT service to authorize payment) or an IM identity is used to validate a payment made on a phone or PDA. In other words both Internet and non-internet based purchases may be approved by sending a real time notice to the client. This is useful to increase security on 'Cmode' and 'wallet functions' of mobile phones as is currently possible in countries like Japan. The e-identity may not only be accessible via a computer but may also be accessed using Xbox, Wii, and other game consoles and cable-TV services which provide user-responses to be obtained from the client.

The FFT features and objects described offer a number of advantages over other systems of fraud prevention. Not only are consumers allowed to participate, but they can also adjust the level of security used during transactions. Rather than attempting to figure out if a consumer is engaged in fraudulent activity without their participation, a much stronger level of protection is provided by allowing active participation. This participation is encouraged by other features of the FFT, such as the provision of an e-transaction history, facilitated enactment of features such as 'extended download service', targeted offers related to their purchases, and other features. The FFT is attractive because it can be used in conjunction with other deterrents and methods. If consumers do not join, then other deterrents of the e-seller can be used. However for the portion of consumers that join, checkout process can be sped up since other types of less effective fraud deterrence need not be relied upon. Although operation of FFT in relation to banking and e-transactions is described in general manner, a primary function of the FFT is in facilitating transactions and deterring fraud, especially repeated attempts a fraud, between a particular seller and candidate consumers.

The presently described embodiments of the fraud deterrent systems and methods offer advantages over prior art. Although modifications and changes may be suggested by those skilled in the art, it is the intention of the inventor to embody within the patent warranted herein all changes and modifications as reasonably and properly come within the scope of their contribution to the art. All prior art cited, including internet address references, are incorporated by reference herein as if recited fully. The titles, headings, and subheadings provided in this specification are provided for organizational purposes only and are not meant to restrict the invention in any way, nor to limit material described in one section from applying to another section as would be apparent to those skilled in the art.

The following are claimed:

1. A system configured for conducting authorization processes during an e-commerce transaction comprising:
an e-identity-card linkage database for storing and retrieving a link between an e-identity and at least one registered credit card number of a client;
a computer having a first processor configured for obtaining an authorization request generated by a seller-side server application module of an e-commerce entity merchant computer having a second processor, said second processor being remote from said first processor, said request including at least a credit card number submitted to the entity during a transaction, the first processor further configured to:
determine if there exists an e-identity which is associated with the credit card number using the e-identity-card linkage database by operating an issuing entity application module;
determine if the e-identity has a status which is (1) available, or (2) unavailable wherein a status designated 'available' defines a status for an e-identity that has been linked with a registered credit card number that matches the credit card number of the transaction and a status designated 'unavailable', defines a status for an e-identity that is not associated with the credit card number of the transaction, and perform the following based upon the determined status:
if the e-identity status is available, an e-identity available operation including sending a notice to a registered computer device associated with the client and processing the notice by software of the registered computer device in order to allow or reject an authorization to be provided according to parameters set by the client for a profile associated with the e-identity, said computer device containing a third processor, remote from said first and second processors; and,
if the e-identity status is unavailable, perform an e-identity unavailable operation which includes performing an alternative method of authentication which is a traditional method of authentication, the alternative method of authentication resulting in one of two outcomes including approval or rejection of a transaction associated with authentication request, the alternative method of authentication includes at least one step selected from the group of:

operating the first processor of the computer to push the transaction to manual review;

operating the first processor of the computer in a traditional manner to request data traditionally entered for e-commerce transactions selected from the group: a consumer's billing address; a shipping address; a phone number; the expiration month and date for a credit card; a security code to verify the credit card; a VBV, a CVV2, a CVC, or other security codes that are used by credit card associations;

operating an algorithm in the first processor of the computer using an FFT analysis module to calculate the risk of fraud;

operating an algorithm in the first processor of the computer to determine whether to automatically accept, automatically reject and/or introduce the intervention of a human operator for manual review of the transaction; and operating the first processor of the computer using a business rule algorithm to determine a set of thresholds which determine the decision to accept, reject, or push the transaction to manual review and wherein the first processor is further configured to process the e-commerce transaction only after at least one of the e-identity available operation, or e-identity unavailable operation, has been completed, and whereby the risk of a transaction being performed without a client's knowledge or permission is decreased and information obtained in identity theft is not sufficient for transaction approval.

2. The system of claim 1, wherein the e-identity available operation includes the following:

sending the notice which includes an authorization request using e-identity information so that the authorization request is presented to a client;

receiving a client input response that is provided in response to said authorization request; and, providing an authorization signal to the e-commerce entity which indicates either to approve or reject the transaction based upon said client input response.

3. The system of claim 1, wherein the e-commerce entity can be any of the following entities:

a credit card issuing bank receiving a payment authorization request from a merchant acquiring bank on behalf of an online seller/merchant;

a payment service provider where users already have established accounts with credit cards; and, a credit card association network which receives payment authorization information from a card issuing bank and is allowed to approve or decline transaction on behalf of the card issuing bank.

4. The system of claim 1, wherein the e-identity available operation includes the following;

sending the notice, said notice including an authorization request;

receiving a client input response that is provided in response to said authorization request;

providing an authorization signal to the e-commerce entity which reflects the client input response to the authorization request, the authorization signal including at least one of approval of the transaction, and a PIN code supplied by the client, and rejection of the transaction.

5. The system of claim 4, wherein the client input response is obtained without the client participation and by using a hardware or software module in a registered device of the client that is configured to receive said notification and to automatically provide information related to the registered device of the client, wherein the module is an eFFT client side model, and automatically providing information related to the registered device of the client and includes providing information that allows confirmation that the transaction is occurring from a computer which is associated with a credit card, and wherein the client input response is obtained directly without requiring a point of sale interaction with the merchant.

6. The system of claim 4, wherein the client input response is obtained without client participation and by using a hardware or software module of a registered device of the client that is configured to receive said notification and to automatically provide information related to the registered device of the client, wherein the automatically provided information related to the registered device of the client includes providing information that allows confirmation that the transaction is occurring from a computer which is associated with a credit card, and wherein the client input response is obtained directly without requiring a point of sale interaction with the merchant.

7. The system of claim 4, wherein the client input response is obtained without the client participation and by using an identification method operational within a registered device of the client that automatically identifies the device of the client as either participating or not participating in the e-commerce transaction related to the authorization request, wherein automatically identifying the device includes automatically confirming that the transaction is occurring from a computer which is associated with the credit card, and wherein the client input response is obtained directly without requiring a point of sale interaction with the merchant.

8. The system of claim 1, wherein the computer is further configured to process the authorization request from the e-commerce entity and to slate a transaction for eFFT processing contingent upon the presence of an Electronic Commerce Indicator included in transaction identification information provided with said request, whereby a transaction identified as originating from an Internet source is differentially operated upon.

9. The system of claim 1, wherein the e-identity unavailable operation includes communicating with the entity to facilitate presenting the client with an interface configured to allow the client to provide logon and password information associated with an account for the credit card.

10. The system of claim 1, wherein the e-identity unavailable operation includes sending a signal to the entity that an e-identity was not found.

11. The system of claim 1, wherein the authorization request further comprises information about the amount being charged, and the computer is further configured to perform anti-fraud measures that are selected based upon the value of the transaction.

12. The system of claim 11, wherein the anti-fraud measures include at least one of:

requiring a client to provide a password;

requiring the client to use a device associated with the e-entity;

requiring the client to use an authentication software program having a particular identification number;

requiring the client to have recently logged into an e-identity within a specified interval.

13. The system of claim 1, wherein the e-identity is associated with an authentication software module having a unique identifier which resides on a device of a client.

14. The system of claim 1, wherein the e-identity is associated with an authentication software module that is configured to receive transaction information data related to at least one of authentication and the transaction from a merchant.

15. The system of claim 1, wherein the e-identity is associated with an authentication software module that is configured to receive transaction information from an entity and to provide this information to the computer, which is compared with information transmitted to the computer by the entity, whereby a match result or mismatch result is produced by this comparison and wherein a match provides authentication of the client.

16. The system of claim 1, wherein the e-identity is associated with an authentication software module that is configured to operate upon transaction information and to provide current browser session log information and whereby the computer is configured to analyze the information to verify that the client associated with the credit card has performed a transaction with a merchant site within a specified recent time interval and whereby if this is true then the client is authenticated and the transaction can be approved.

17. The system of claim 13, wherein the authentication software module is configured to operate upon transaction information and to provide current browser session log information and whereby the computer is further configured to operate so that the transaction is rejected if the browser session log information provided by the authentication software module does not indicate a client presence on a merchant site which corresponds to a merchant site that is involved in the transaction within a specified time interval from the time of the authorization request which is related to the transaction.

18. A system for conducting authorization processes during e-commerce transactions comprising:

a client-card linkage database for storing and retrieving a link between a client and at least one registered credit card number;

an online-identity-client linkage database for storing and retrieving a link between an online identity and a client;

a computer having a first processor configured for obtaining an authorization request generated from a seller-side server application module of an e-commerce entity merchant computer having a second processor, said request including at least a credit card number submitted to the entity during a transaction, the first processor further configured to:

determine whether the client who is associated with at least one credit card number is associated or is not associated with an online-identity by operating an issuing entity application module; and if the client is not associated with an on-line identity then implement a first set of operations for allowing a client to provide authentication, wherein this first set of operations for authentication includes at least one step of traditional method of authentication selected from the group: operating the computer to push the transaction to manual review; operating the computer in a traditional manner to request data traditionally entered for e-commerce transactions selected from the group: a consumer's billing address; a shipping address; a phone number; the expiration month and date for a credit card; a security code to verify the credit card; a VBV, a CVV2, a CVC, or other security codes that are used by credit card associations; operating an algorithm in the computer using an FFT analysis module to calculate the risk of fraud;

operating an algorithm in the computer to determine whether to automatically accept, automatically reject and/or introduce the intervention of a human operator for manual review of the transaction;

operate the computer using a business rule algorithm to determine a set of thresholds which determine the decision to accept, reject, or push the transaction to manual review, in order to provide for one of two outcomes resulting in approval or rejection of a transaction associated with authentication request, and if the client is associated with an online identity then implement a second set of operations to achieve the following:

determine if the client is authorized to use the credit card number of the transaction using the client-card linkage database by performing operations according to parameters set in the database for the online identity including sending notice to a registered computer device associated with the client e-identity, and processing the notice by software of the registered computer device in order to allow or reject an authorization said computer device containing a third processor, remote from said first and second processors;

provide an approval authorization signal to the e-commerce entity if the operations indicate that the client is authorized to use the credit card number; and provide a rejection authorization signal to the e-commerce entity if the operations indicate that the client is not authorized to use the credit card number;

wherein providing the approval authorization signal or rejection authorization signal to the e-commerce entity which allows processing of the e-commerce transaction occurs only after at least one of the e-identity available operation, or e-identity unavailable operation, has been completed, and whereby the risk of a transaction being performed without a client's knowledge or permission is decreased and information obtained in identity theft is not sufficient for transaction approval.

19. The system of claim 18, wherein the online-identity includes information for the client that is provided by an internet service provider which the client uses to connect to the internet.

20. The system of claim 18, wherein the online-identity includes information for the client that is provided by a service provider which the client uses to connect to the internet and includes at least one of the following: credit card information supplied by the client to pay their bills, an active transaction number; or, a session identification number.

21. The system of claim 18 wherein the online-identity is assigned to the client by a service provider which the client uses to connect to the internet and includes information related to authenticating the client.

22. The system of claim 1 wherein the computer configured for obtaining an authorization request comprises at least a plurality of servers configured to provide an eFFT service by operating upon fraud deterrent software.

* * * * *